United States Patent
Tanaka et al.

(10) Patent No.: US 6,435,969 B1
(45) Date of Patent: Aug. 20, 2002

(54) PORTABLE GAME MACHINE HAVING IMAGE CAPTURE, MANIPULATION AND INCORPORATION

(75) Inventors: Hirokazu Tanaka; Takashi Ohno; Noriaki Teramoto, all of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/430,169

(22) Filed: Oct. 29, 1999

Related U.S. Application Data
(60) Provisional application No. 60/106,913, filed on Nov. 3, 1998.

(51) Int. Cl.[7] .......................... A63F 9/24; G03B 17/00; G03B 29/00
(52) U.S. Cl. .......................................... 463/44; 463/46
(58) Field of Search ................................ 463/1, 30, 31, 463/43, 44, 45, 46, 47, 48; 273/148 B; 396/29, 297, 429, 439; 348/49, 61, 73, 906, 909

(56) References Cited

U.S. PATENT DOCUMENTS

| | | |
|---|---|---|
| 4,261,012 A | 4/1981 | Maloomian |
| 4,286,849 A | 9/1981 | Uchidoi et al. |
| 4,467,349 A | 8/1984 | Maloomian |
| 4,486,774 A | 12/1984 | Maloomian |
| 4,517,658 A | 5/1985 | Iida |
| 4,521,014 A | 6/1985 | Sitrick |
| 4,539,585 A | 9/1985 | Spackova et al. |
| 4,541,010 A | 9/1985 | Alston |
| 4,566,263 A | 1/1986 | Miyazaki et al. |
| 4,591,897 A | 5/1986 | Edelson |
| 4,662,635 A | 5/1987 | Enokian |
| 4,684,995 A | 8/1987 | Baumeister |
| 4,710,873 A | 12/1987 | Breslow et al. |

(List continued on next page.)

FOREIGN PATENT DOCUMENTS

| | | |
|---|---|---|
| JP | 3-139064 | 10/1989 |
| JP | 4-329758 | 4/1991 |
| JP | 6-44215 | 2/1994 |
| JP | 6-96180 | 4/1994 |
| JP | 8-18839 | 1/1996 |
| JP | 8-223524 | 8/1996 |
| JP | 9-140936 | 6/1997 |
| JP | 3-275092 | 3/1998 |

OTHER PUBLICATIONS
Game Boy® Camera Instruction Booklet.

*Primary Examiner*—Michael O'Neill
(74) *Attorney, Agent, or Firm*—Nixon & Vanderhye P.C.

(57) ABSTRACT

An improved portable game machine having a removably attachable external cartridge that includes an integrally formed image capturing apparatus is provided. The portable game machine preferably includes a user interface which may be manipulated by a user to capture images via the image capturing device of the external cartridge. The thus captured images may then be used in game play, or may be manipulated by the user to extend the range of enjoyment of the game. For example, according to the present invention, the user has the ability to associate hot spots with captured images which, when uncovered, cause the portable game machine to exhibit an effect associated with the hot spot. Additionally, the user is provided with the ability to incorporate line drawings or predefined stamp images into a captured image. The captured images may also be arranged to form an animation or loop of images that are displayed according to a sequence defined by the user. Another feature provided by the improved portable game machine of the present invention is the ability to print out composite images made up of a plurality of captured images. The composite image is typically larger than a single image, and therefore, is not easily displayed on a display of the portable game machine, but may be printed as a composite on an associated printer.

9 Claims, 25 Drawing Sheets

U.S. PATENT DOCUMENTS

| | | |
|---|---|---|
| 4,731,743 A | 3/1988 | Blancato |
| 4,803,554 A | 2/1989 | Pape |
| 4,823,285 A | 4/1989 | Blancato |
| 4,827,347 A | 5/1989 | Bell |
| 5,013,107 A | 5/1991 | Sasson et al. |
| 5,093,731 A | 3/1992 | Watanabe et al. |
| 5,095,798 A | 3/1992 | Okada et al. |
| 5,111,283 A | 5/1992 | Nagasawa et al. |
| 5,153,729 A | 10/1992 | Saito |
| 5,182,647 A | 1/1993 | Chang |
| 5,184,830 A | 2/1993 | Okada et al. |
| 5,185,818 A | 2/1993 | Warnock |
| 5,191,645 A | 3/1993 | Carlucci et al. |
| 5,200,863 A | 4/1993 | Orii |
| 5,237,648 A | 8/1993 | Mills et al. |
| 5,239,419 A | 8/1993 | Kim |
| 5,249,242 A | 9/1993 | Hanson et al. |
| 5,255,357 A | 10/1993 | Byron et al. |
| 5,262,867 A | 11/1993 | Kojima |
| 5,293,236 A | 3/1994 | Adachi et al. |
| 5,301,026 A | 4/1994 | Lee |
| 5,301,267 A | 4/1994 | Hassett et al. |
| 5,303,334 A | 4/1994 | Snyder et al. |
| 5,305,118 A | 4/1994 | Schiller et al. |
| 5,343,243 A | 8/1994 | Maeda |
| 5,371,540 A | 12/1994 | Tamura et al. |
| 5,396,225 A | 3/1995 | Okada et al. |
| 5,414,444 A | 5/1995 | Britz |
| 5,437,008 A | 7/1995 | Gay et al. |
| 5,438,359 A | 8/1995 | Aoki |
| 5,440,441 A | 8/1995 | Parulski et al. |
| 5,442,543 A | 8/1995 | Tresp |
| 5,459,819 A | 10/1995 | Watkins et al. |
| 5,475,441 A | 12/1995 | Parulski et al. |
| 5,475,539 A | 12/1995 | Orii |
| 5,477,264 A | 12/1995 | Sarbadhikari et al. |
| 5,493,409 A | 2/1996 | Maeda et al. |
| 5,504,842 A | 4/1996 | Gentile |
| 5,506,944 A | 4/1996 | Gentile |
| 5,524,194 A | 6/1996 | Chida et al. |
| 5,539,459 A | 7/1996 | Bullitt et al. |
| 5,539,865 A | 7/1996 | Gentile |
| 5,543,835 A | 8/1996 | Mumura |
| 5,544,290 A | 8/1996 | Gentile |
| 5,546,528 A | 8/1996 | Johnston |
| 5,553,864 A | 9/1996 | Sitrick |
| 5,577,189 A | 11/1996 | Gay et al. |
| 5,581,299 A | 12/1996 | Raney |
| 5,581,311 A | 12/1996 | Kuroiwa |
| 5,586,238 A | 12/1996 | Murata |
| 5,595,389 A | 1/1997 | Parulski et al. |
| 5,600,767 A | 2/1997 | Kakiyama et al. |
| 5,601,487 A | 2/1997 | Oshima et al. |
| 5,602,976 A | 2/1997 | Cooper et al. |
| 5,612,732 A | 3/1997 | Yuyama et al. |
| 5,625,711 A | 4/1997 | Nicholson et al. |
| 5,625,716 A | 4/1997 | Borg |
| 5,631,701 A | 5/1997 | Miyake |
| 5,633,678 A | 5/1997 | Parulski et al. |
| 5,633,733 A | 5/1997 | Miyazawa |
| 5,633,985 A | 5/1997 | Severson et al. |
| 5,634,064 A | 5/1997 | Warnick et al. |
| 5,638,438 A | 6/1997 | Tyler et al. |
| 5,638,502 A | 6/1997 | Murata |
| 5,638,503 A | 6/1997 | Hoel |
| 5,666,159 A | 9/1997 | Parulski et al. |
| 5,681,223 A | 10/1997 | Weinreich |
| 5,682,197 A | 10/1997 | Moghadam et al. |
| 5,689,611 A | 11/1997 | Ohta et al. |
| 5,696,850 A | 12/1997 | Parulski et al. |
| 5,706,097 A | 1/1998 | Schelling et al. |
| 5,706,457 A | 1/1998 | Dwyer et al. |
| 5,708,883 A | 1/1998 | Segan et al. |
| 5,715,486 A | 2/1998 | Kim et al. |
| 5,719,799 A | 2/1998 | Isashi |
| 5,729,637 A | 3/1998 | Nicholson et al. |
| 5,737,452 A | 4/1998 | Schiller |
| 5,737,491 A | 4/1998 | Allen et al. |
| 5,745,122 A | 4/1998 | Gay et al. |
| 5,748,326 A | 5/1998 | Thompson-Bell et al. |
| 5,754,227 A | 5/1998 | Fukuoka |
| 5,781,198 A | 7/1998 | Korn |
| 5,784,525 A | 7/1998 | Bell |
| 5,796,429 A | 8/1998 | Suzuki et al. |
| 5,830,065 A | 11/1998 | Sitrick |

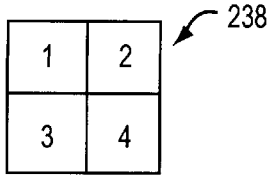
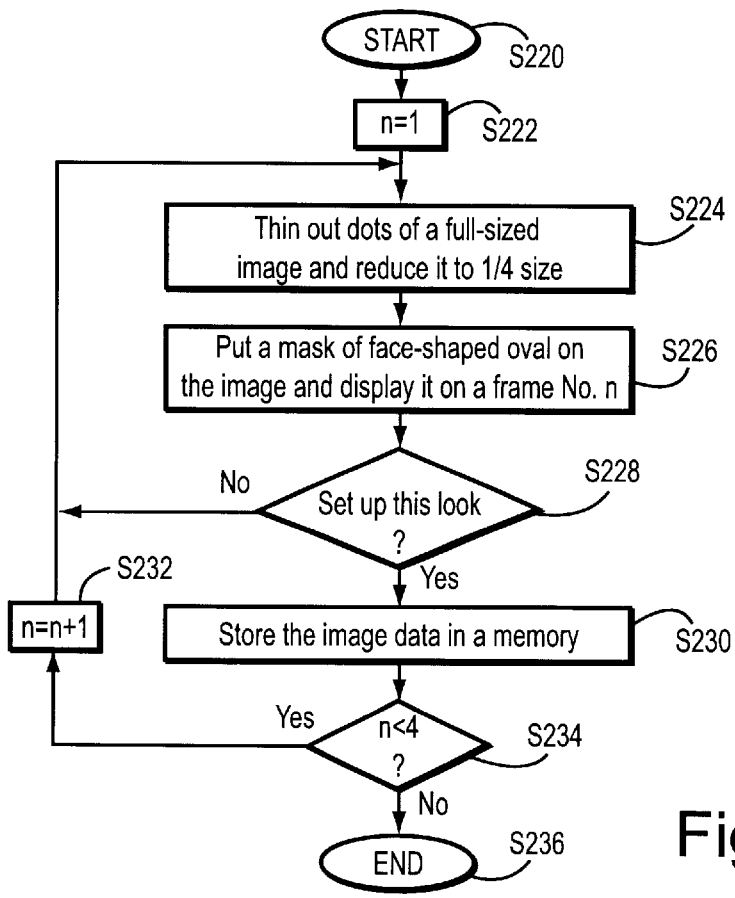
Fig16A
Fig16B
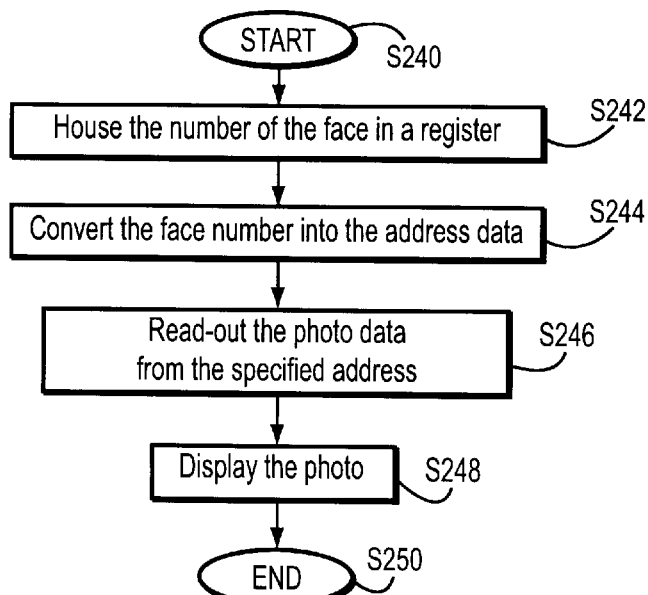
Fig16C

PORTABLE GAME MACHINE HAVING IMAGE CAPTURE, MANIPULATION AND INCORPORATION

CROSS-REFERENCE TO RELATED APPLICATIONS

This application is related to commonly assigned U.S. patent application Ser. No. 09/026,804, filed Feb. 20, 1998, now U.S. Pat. No. 6,720,379 and claims priority from U.S. Provisional Patent Application Serial No. 60/106,913, filed Nov. 3, 1998.

BACKGROUND OF THE INVENTION

1. Field of the Invention

The invention relates generally to portable game machines using portable game machine cartridges. In particular, the invention is directed to a portable game machine using a portable game machine cartridge having the ability to capture an image, the portable game machine allowing, the user to manipulate the captured image and to incorporate the captured and or manipulated captured image into a game that is being played on the portable game machine.

2. Description of Related Art

Portable hand-held game machines have been known for quite some time. Typically, these portable game machines include a hand held game machine housing a processing unit and associated hardware for running a gaming program, and include a display for displaying images of the game. The gaming program is typically contained in a game program memory, such as, for example, a semiconductor memory (e.g., ROM, EPROM, etc.) that is part of a removable cartridge. By storing the gaming program in a removable cartridge, the user is allowed to conveniently and easily change the game being played, by simply exchanging the cartridge with one containing a different game. An example of such a portable game machine is the "Game Boy™" product manufactured and sold by Nintendo Corporation, assignee of the instant application.

However, it will be understood, that conventional portable game machines of the type described above, can only execute the game that is contained in the game program memory of a particular removable cartridge. The images displayed during game play are limited to those that are contained in a memory of the removable game cartridge. While the images may change based on various inputs received from the user, these images are predefined and are not subject to any manipulation or variation by the user, other than those predetermined changes that occur based on the various situations encountered during game play.

Having only limited predetermined images available for use in a portable game machine restricts the ability of the user to enjoy the machine. It would be more enjoyable for the user to have a more interactive relationship with the game program and the portable game machine. To that end, what is needed is a portable game machine that enables the user to define, manipulate and incorporate images into the game being played. Additionally it would be beneficial to provide the user with the ability to capture images for use with a game, or even to merely store captured the images for use with various other features of the portable game machine.

Image capture and manipulation technologies are well known and exist in many forms. Typically, these image capturing and manipulation devices are very costly and are cumbersome to use, especially in the context of a portable game machine. For example, there are many different types of video cameras and digital still cameras available for capturing images. However, video cameras and digital still cameras are typically very expensive (especially as compared to portable game machines), and would not be used as a toy or game for children. It is also very complicated to manipulate the images captured by these devices, especially for use in a portable game environment.

There are also various computer based applications that provide a user with the ability to receive a digital image and to manipulate the digital image. There are also numerous computer programs that enable a user to draw an image or to create animation. However, as set forth above, all of these known image capturing and manipulation technologies are ill suited for portable game use, and are typically prohibitively expensive in the context of gaming applications.

SUMMARY OF THE INVENTION

To overcome the above-noted and other deficiencies of prior portable game systems, and to improve the enjoyment of portable game system users, the instant invention provides a portable game machine that includes a portable game cartridge incorporating a digital camera for capturing digital images, which is inexpensive and easy for children to use in a portable game environment. In addition, numerous features are provided that enable the user to easily manipulate the captured images and incorporate these images (manipulated or not) into the games being played.

Related co-pending, commonly assigned U.S. patent application Ser. No. 09/026,804 filed Feb. 20, 1998, the disclosure of which is incorporated by reference herein, describes a portable game machine and portable game machine cartridge capable of capturing an image and processing the image as a still picture, to extend the range of use of the portable game machine for entertainment, thereby expanding the entertainment value of the system.

The instant invention provides specific features for use in manipulating and processing the captured image for use in the portable game system. Among the features described in the instant application are: hot spots; game face; animation and loops; panoramic picture taking and printing; and other image manipulation, including the use of doodling functions, such as, for example, stamp and paint functions.

In operation, the user of the portable game machine inserts the removable cartridge into the portable game machine. The removable cartridge includes a digital camera and associated image capturing and storage hardware and software, substantially as set forth in commonly assigned co-pending U.S. patent application Ser. No. 09/026,804. Upon starting of the game operation, the user will be given to option to select whether to shoot an image. By selecting the option of shooting an image, the display of the portable game machine will show a virtual View Finder Screen which shows the user the images being received via the digital image capturing apparatus of the removable cartridge. The camera lens of the image capturing apparatus can be rotated to change its image capturing direction (as will be described in detail herein). As the image is displayed, various functions may be implemented to create the desired image to be captured. These functions include brightness, contrast, sharpness, and the like. Other interesting functions, such as flipping the captured image with respect to a central horizontal or vertical axis may also be accomplished, thereby providing an upside down version of the image or mirror image, respectively of the image to be captured.

Once the user is satisfied with the image appearing in the View Finder Screen, the user may then capture the image by pressing the appropriate button on the face of the portable game device. The number of images that may be captured will, of course be limited by the memory availability associated with the removable cartridge. At the present time, it is contemplated that up to thirty captured images may be stored in the portable game cartridge according to the present invention. However, it will be understood that any number of images may be stored depending upon memory size. It is also envisioned that the captured images will be stored in, and retrievable from, a memory that may be displayed to the user in the form of a captured image photo album.

When the image has been captured, the user has the option of scrolling through the images captured in a check mode. When checking the images that have been captured, the display will show a Check Screen, as opposed to the View Finder Screen displayed when capturing an image. In the Check Screen, the user is provided with numerous options. For example, the user may choose to print the captured image on an associated printer that may be, for example, a thermal printer including paper having an adhesive backing, thereby allowing the user to make stickers showing the captured image. The user may wish to delete the image altogether. Additionally, the user is given the option to manipulate the image by doodling using predefined stamps, or drawing directly on the captured image. Another option may include associating a comment field with the image to provide a message or associate a sound with a given image. Other features include, for example, creating hot spots within an image to provide the user with the ability to jump to other images within the memory, to associate a given sound with a particular portion of an image, or to create an effect associated with the image, when the hot spot is found by the user; creating animations using selected captured images; and creating panoramic images using up to four captured images, to name a few. These functions will be described in summary herein.

Hot Spots:

A hot spot is generally defined to be a pre-selected portion of an image with which a particular function or effect is associated. For example, in a captured image, a user may create a hot spot associated with particular areas of the image, such as, for example, the nose, eyes, ears, mouth, etc. of the captured image. Once the hot spots have been created, defined and associated with a captured image, the hot spots will not be visible to players attempting to locate and uncover the hot spots associated with the image.

A user, or subsequent viewer, of the images having associated hot spots may then attempt to locate the hot spot using the cursor of the portable game device to see what associated effect is performed when the hot spot is discovered. When a hot spot has been located by the user, the effect associated with that hot spot will be displayed. Hot spot effects may include, for example, a sound effect, a visual effect or a jump to another captured image in the album of captured images. A sound may be any of a number of predefined sounds contained in the portable game cartridge. An example of a visual effect, is the changing of the viewed image to one that includes stamps or other doodles (see description below). A jump associated with the hot spot causes the portable game device change the captured image being viewed and to display another image, that is residing in the captured image photo album, defined by the creator of the hot spot. If the hot spot causes a jump to another image, if the new image has hot spots associated therewith, the user may attempt to find the hot spots associated with the new image. In a preferred embodiment, up to five hot spots may be associated with an image. However, it will be understood that any number of hot spots may be associated with a given image, but that the number of hot spots is necessarily limited by the available memory space associated with a given image.

Game Face:

Another feature of the portable game machine having an image capturing device is the use of game faces. Game faces are specialized captured images that are associated with the play of various games included in the removable cartridge. For example, in a juggling game, the game face may be included in the game to be the face of the juggler. According to the present invention, the game face images captured by the user are used variously throughout the playing of a game which uses the game face, and the particular game face image used at any given time during game play may be dependent upon the actions taken by the user in playing the game, or may be associated with a particular result achieved during play of the game.

According to the present invention, in capturing the game face images, the display view finder is divided into four quadrants. Each quadrant is a different part of the game face, and includes an entire captured image. It will be noted that the game face images are stored in an area of the memory separate from the photo album of captured images, and that game face images are specialized images for use in game play only. Therefore, game face images cannot have links, hot spots, comments, and the like associated therewith because of their specialized use in certain games. However, game face images can be manipulated by doodling using stamps and paint, and the like, with the images. Additionally, game faces may be created using the doodle feature alone, and without using captured images, per se. Thus, the game face may be an entirely created face using only the doodling tools provided with the game.

In operation of a given game, the game face sequence may, for example, toggle between two of the captured game face images. If any damage occurs, i.e., the image is injured or fails to successfully complete a portion of the game, another of the game faces may be displayed. For example, in the juggling game, while successfully juggling, the face of the juggler may switch between a first and second game face. If a ball is dropped, a third face may be displayed. Upon completion of the game, the fourth game face image may be displayed. It will be appreciated that any combination of game face images may be used in any particular event during game play, as defined by the designer of the game.

Image Manipulation/Doodling:

The images captured by the portable game cartridge may be manipulated in a number of different ways. For example, as described above, images may have hot spots associated therewith. Another example of image manipulation is the incorporation of stamps or painted doodles with a captured image.

Examples of doodling include the incorporation of predefined stamps or user created line drawings, e.g., paint. It is envisioned that the memory of the portable game cartridge includes, in addition to the captured image and game face memory space, a space for storing predefined images that may be copied for use in manipulating the captured images. The predefined images may include, for example, stamps that can be "cut and pasted" onto the captured images. For example, the stamps may include various exaggerated and fanciful drawings of eyes, horns, noses, glasses, mustaches, characters, and the like, which can be selected by the user to alter a captured image. These predefined stamps may be stored in a stamp album that is similar to the captured image photo album, but which is separate from the captured image photo album. Additionally, it is preferable that the predefined images of the stamp album cannot be altered by the user, but may be copied for use in manipulating the captured images.

In addition to stamping the captured image with predefined images stored in the stamp memory area, i.e., the stamp album, of the portable game cartridge, the user may also draw arbitrary lines or figures in the captured image using the paint function. By manipulating the buttons of the portable game machine in the appropriate manner, the user may draw lines of varying widths and shades in different areas of the captured image.

A captured image that has been altered using the doodling functions described above, may be saved in the captured image album in the same manner as any other captured image, and the images thus stored, may be used in any function in which normally captured images may be used, such as, for example, in hot spots or animations, as described below.

Panorama:

Another feature contemplated by the present invention is the provision of combining captured images to produce an image up to four times larger than one image that may ordinarily be captured. To take such larger pictures for subsequent printing out, the panorama function may be used. The panorama function may use a number of frames either vertically or horizontally to create a panoramic or combined image. In the instant example, up to four images may be used to form a panorama. Panoramas may be saved, but cannot be used with certain other features, such as, for example, hot spots, animations, and the like, because of the various linking information required to keep the panorama intact.

When shooting a panorama, a portion of the first frame may be used as a background for shooting the second frame, and a portion of the second frame may be used as a background for shooting the third frame, and so on to ensure proper alignment of adjacent frames that are used to form the panorama.

Panoramas are primarily used to capture images that are large, and which, therefore, cannot be contained in a single frame, and are typically printed out via a thermal printer onto paper that has an adhesive backing to form a sticker, or the like.

Animation and Loops:

Yet another feature contemplated by the present invention is the use of multiple captured image frames to create an animation. The animation may be made up of a logical sequence of frames to simulate movement, or may be any arbitrary sequential display of captured image frames. When the user enters the animation screen of the portable game display, various sequentially numbered frames of the animation may be defined by the user. The user may select a frame of the animation, and import to that frame any image residing in the captured image photo album or predefined stamp album. The selected image will be imported into a numbered frame of the animation. The number of the animation frame corresponds to the position in the sequence of frames to be displayed when the animation is viewed. The user may continue to assign various captured images from the photo album to various frames of the animation until the animation is complete, or until the number of available animation frames is exhausted.

As with other features described herein, the number of available animation frames is dependent upon the amount of memory available or assigned to the animation function. In a preferred embodiment of the instant application, for example, up to forty-seven frames may be used to create an animation. It is contemplated that the animation will be stored as a series of sequential pointers that point to selected portions of the various image memories corresponding to the images selected for the frames of the animation. This manner of virtually storing the animation frames reduces the need for a separate image memory to accommodate the animation function.

Once the frames making up the animation have been selected, the animation may be played in either a loop mode or a one-time play mode. In the loop mode, the animation will keep repeating until the user depresses a button requesting that the play be stopped. Otherwise, the animation will play only once. The animation may be edited or modified to change the frames, delete certain frames, or to rearrange the order of frames to be displayed. Additionally, a loop may be a subset of the animation frames that may be played repeatedly or a single time.

There are numerous other features that may be employed in the instant invention to increase user satisfaction and enjoyment. For example, trick lenses may be used to create mirror images, tiled images, combinations or montages, split screens and fusion or blending of different captured images. Any number of special effects known in the digital image art may be included in the portable game of the instant invention.

BRIEF DESCRIPTION OF THE DRAWINGS

The present invention will be described in detail herein with reference to the following drawings, in which like reference numerals refer to like elements, and wherein:

FIGS. 16A–16D are flow charts describing the game face feature of the present invention;

DETAILED DESCRIPTION OF EXEMPLARY EMBODIMENTS

Figure 1:
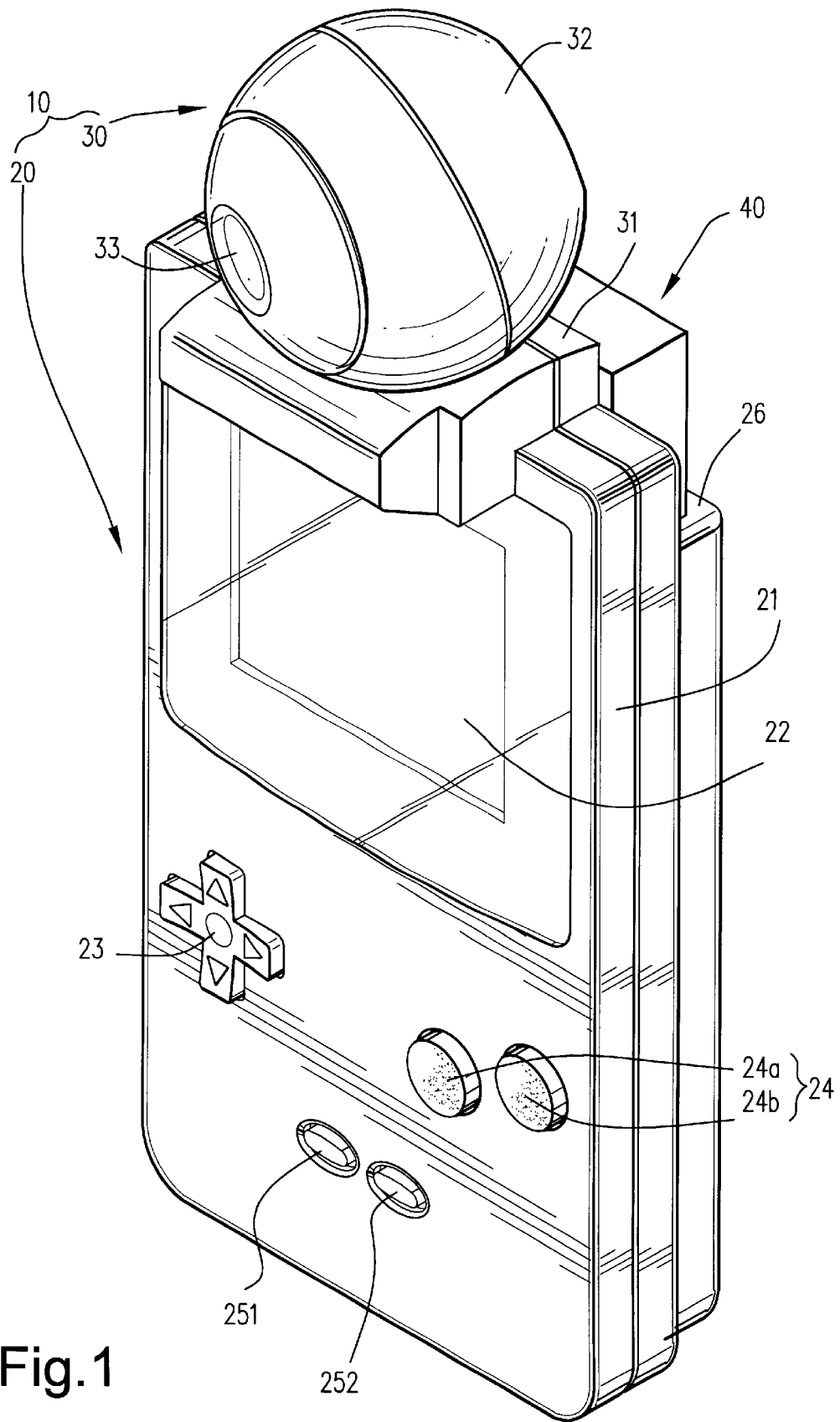
FIG. 1 is an external perspective view showing an exemplary structure of a portable game machine according to the present invention.

The invention will be described herein with reference to an exemplary embodiments thereof. Turning, first to the electrical and mechanical features of the portable game machine and portable game machine cartridge including the digital camera according to the present invention, FIG. 1 is an external perspective view showing the structure of a portable game machine 10 according to an embodiment of the present invention, and specifically showing a camera portion 30 integrally mounted on a body of the portable game machine 20. In FIG. 1, the portable game machine 10 of the present embodiment includes a game machine body portion (hereinafter abbreviated simply as "body portion") 20, and a camera portion 30 that is integrally formed on the upper portion (upper edge) when viewed from the front of the body portion 20. In addition, a portable game machine cartridge (hereinafter abbreviated as "cartridge") 40, integrally formed with the camera portion 30, is removably inserted in the upper portion of the rear surface of the body portion 20.

The body portion 20 includes a housing 21 defining the external view of the game machine and accommodating, in its inner space, an electrical circuit described later. The housing 21 is formed, for example, in a flat, vertically elongated rectangular parallelepiped shaped having a prescribed thickness. An image display device (for example, liquid crystal display device) 22 for displaying game images is arranged on the upper area of one main surface (front surface) of the housing 21. In addition, the housing 21 includes, on its lower area, a direction instructing switch 23 arranged in the vicinity of one side surface, and a motion instructing switch 24 arranged in the vicinity of the another side surface. The direction instructing switch 23 is used for controlling a moving direction of a character for a game displayed on the image display device 22. The motion instructing switch 24 is generally used for purposes other than instructing the moving direction of the character (for example, instructing a jump, punch, and motion of grabbing something), and is formed of a plurality of switches 24a and 24b, as required. A start key 251 for instructing a start of the game and a select key 252 for selecting game contents are arranged, for example, between the direction instructing switch 23 and the motion instructing switch 24. On the upper area of the rear surface of the housing 21, an insertion opening 26 for receiving the cartridge 40 is provided. A connector (connector 27 shown in FIG. 2, described later) is provided inside the cartridge insertion opening 26 for contacting with a terminal (e.g., edge connector) of a substrate included in the cartridge 40 to electrically connect a circuit on the substrate to an electric circuit in the housing 21.

Figure 2:
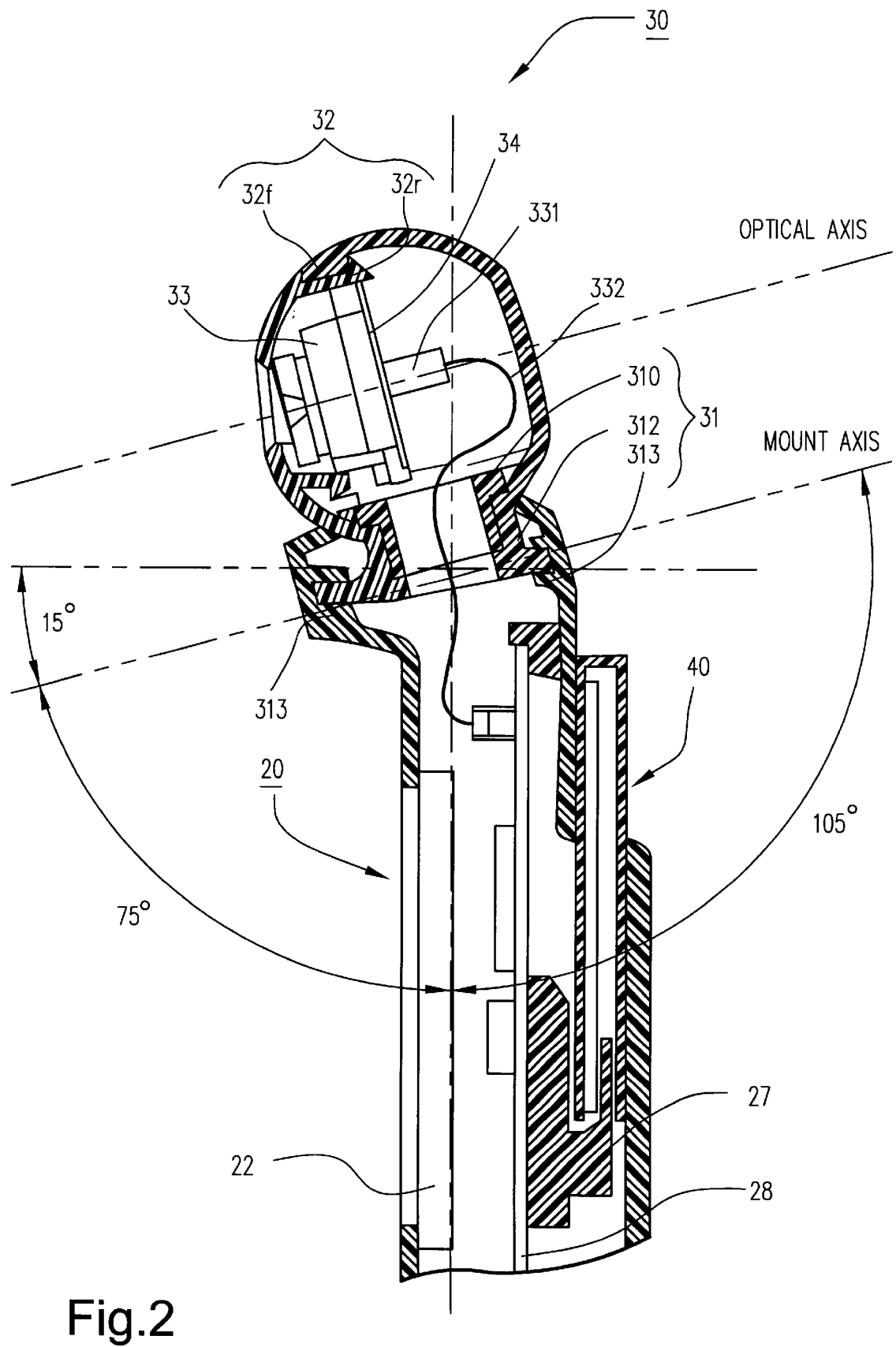
FIG. 2 is a sectional view showing details of the camera portion and its supporting portion shown in FIG. 1.

FIG. 2 is a section view showing the detail of the camera portion 30 and a supporting portion 31 shown in FIG. 1. In FIG. 2, the camera portion 30 is provided with a generally spherical case 32 containing an image pickup device 33, and is supported rotatably in a lateral direction when viewed from the front by the supporting portion 31. Preferably, as shown in detail in FIGS. 3 to 5 described later, the supporting structure has a rotation angle range of approximately 180 degrees so that a viewing range of the camera portion 30 can turn to both of the forward direction of the front surface and the backward direction of the rear surface. Further, a mount angle (i.e., an angle which is a mount axis, which is parallel to an optical axis, of the camera portion 30 tilts with respect to the direction at a right angle to one main surface and the other main surface of the housing 21) is selected in a range of 10 to 45 degrees (preferably, approximately 15 degrees), for example, which is in a upward direction with respect to a depth direction (a direction going through at a right angle from one main surface to the other main surface) of the housing 21. When the mount angle is selected at 15 degrees, for example, the angle which the mount axis forms with respect to one main surface of the housing 21 is 75 degrees (i.e., acute angle), while the angle which the mount axis forms with respect to the other main surface of the housing 21 is 105 degrees (i.e., an obtuse angle). This means that in a state where the user holds the housing 21 with both hands, a viewing direction of the camera portion 30 points diagonally upward with respect to the depth direction of the housing 21 when the image pickup device 33 points to the backward direction of the other main surface, while pointing diagonally downward with respect to the opposite direction of the depth direction when the image pickup device 33 points to the forward direction of one main surface. Therefore, when the user holds the housing 21 with both hands, when the image pickup device 33 points to the forward direction of one main surface, the face of the user who watches the image display device 22 is received by the camera portion 30, and in reverse, when the image pickup device 33 points to the backward direction of the other main surface, a person ahead of the user, or a forward view or thing is received by the camera portion 30.

In this manner, the supporting portion 31 rotatably supports the camera portion 30 in a lateral direction of the body portion 20 to allow the user to easily change the shooting range by simply changing the direction of the camera portion 30 and also to shoot and display the forward direction of the user and the user himself/herself (or the backward direction of the user) on the image display device 22 when the rotation range is selected to approximately 180 degrees. Further, the supporting axis with which the supporting portion 31 supports the camera portion 30 is inclined to allow the user to freely adjust the shooting range in the forward direction or on the user side by only slightly including both wrists when holding the housing 21 with both hands, without requiring the user to take an uncomfortable position when adjusting, thereby and reducing the fatigue of the wrists.

Figure 3:
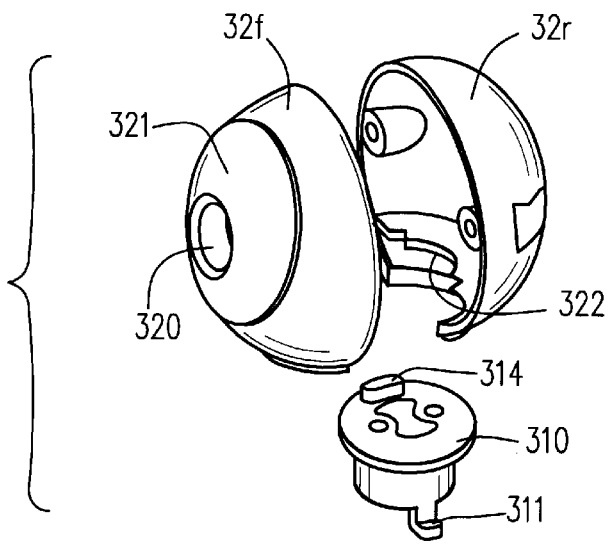
FIG. 3 is an exploded perspective view of the image pickup device showing a more detailed structure of the camera portion and its supporting portion.
Figure 4:
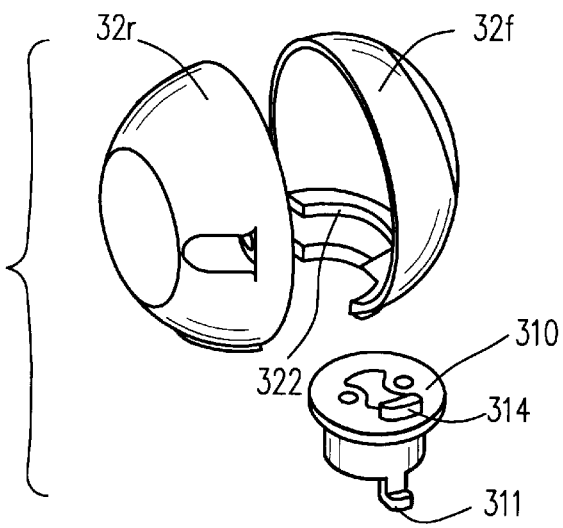
FIG. 4 is another exploded perspective view of the image pickup device showing a more detailed structure of the camera portion and its supporting portion.
Figure 5:
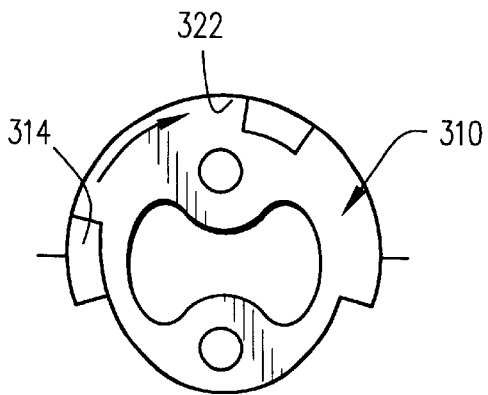
FIG. 5 is a top plan view of the supporting body of the camera portion.

FIGS. 3, 4 and 5 are detailed diagrams of the camera portions 30 and the supporting portion 31, and specifically. FIG. 3 is an exploded perspective view of the camera portion 30 viewed from the direction the image pickup device 33 points to, FIG. 4 is an exploded perspective view viewed from the rear surface side of the image pickup device 33, and FIG. 5 is a top plan view of a generally spherical supporting body 310. Next, referring to FIGS. 2 to 5, described is the detailed structure of the camera portion 30 and the supporting portion 31.

The camera portion 30 includes the generally spherical case 32. The spherical case 32 is formed in a spherical shape by combining two half-spheres, a front half 32f and a rear half 32r. A front panel 321 on which an opening 320 for launching an optical image therein is formed is mounted on the front half 32f. A camera substrate 34 (refer to FIG. 2) implementing the image pickup device 33 provided inside the camera portion 30. The camera substrate 34 on which the image pickup device 33 is placed is fixedly supported by the spherical case 32 so as to have a prescribed angle (15 degrees, for example) with respect to one main surface of the housing 21. A guide groove 322 is formed on a lower inner wall of the spherical case 32. A collar-shaped portion of the spherical supporting body (hereinafter referred to as "supporting body") 310 is engaged in the guide groove 322 to rotatably support the spherical case 32. The supporting body 310 is provided with an engaging protrusion 311 formed on the bottom surface thereof, and is fixed with the engaging protrusion 311 engaged in a fixed supporting body 312. The fixed supporting body 312 is fixedly supported by an inner wall of a supporting protrusion 313. A protrusion 314 is formed on the top surface of the supporting body 310 to regulate the rotational area of the sphere case 32. The supporting portion 31 is thus structured by the supporting body 310, the fixed supporting body 312 and the supporting protrusion 313.

The image pickup device 33 includes a lens (not shown) and an optoelectronic device (such as, for example, a CCD sensor or an area image sensor; not shown) for converting an optical image light-gathered by the lens into electrical signals. The electrical signals converted by the image pickup device 33 are resolved (scanned) into image data for one frame, provided through a connector 331 and a cable 332 to a substrate 28 in the body portion 20, and processed by a processing unit (CPU). The details will be described later with reference to FIG. 13.

In another implementation, when the depth dimension of the camera portion 30 is so large as to substantially protrude to one and/or the other main surface, the cartridge 40 might interfere with the camera portion 30 at the position of the insertion opening 26, and not be allowed to be inserted into the insertion opening 26 because the cartridge 40 is inserted from the upper direction. Therefore, the insertion opening 26 may be provided at a position where the cartridge 40 can be inserted from another direction (for example, the lower direction of the lateral direction). Further, the image pickup device 33 may be provided with an aperture mechanism between the lens and the optoelectronic device as required. In this case, the aperture mechanism is preferably structured to be adjustable from outside of the spherical case 32.

In the above embodiment, while the camera portion 30 and the supporting portion 31 are integrally formed on the upper portion edge of the body portion 20, the camera portion 30 and the supporting portion 31 may be integrally formed on the cartridge 40 inserted in the body portion 20 in the present invention. Another embodiment, described below, provides that the camera portion 30 and the supporting portion are integrally formed on the cartridge 40.

Figure 6:
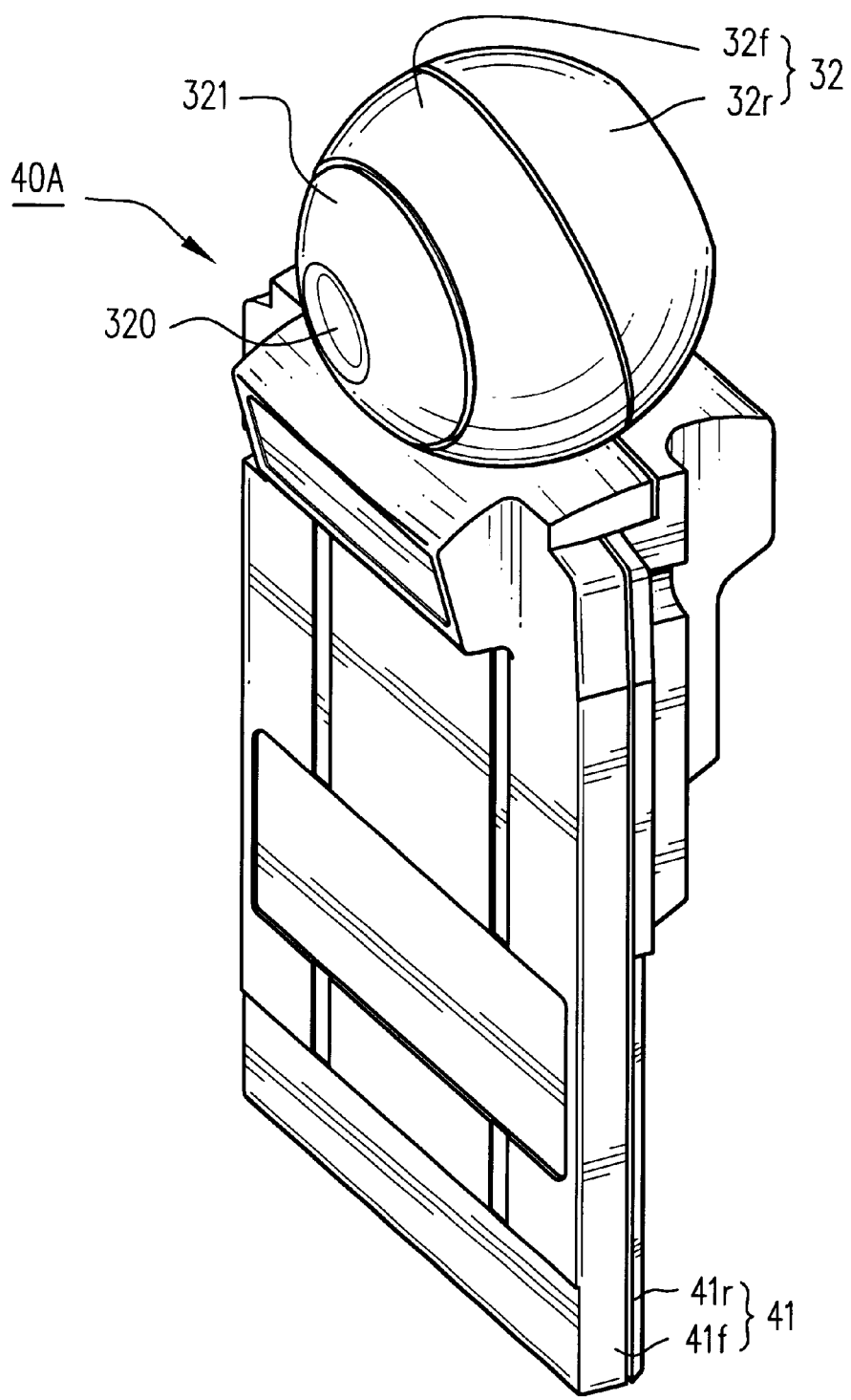
FIG. 6 is an external perspective view of a structure of a portable game cartridge incorporating the camera portion.
Figure 7:
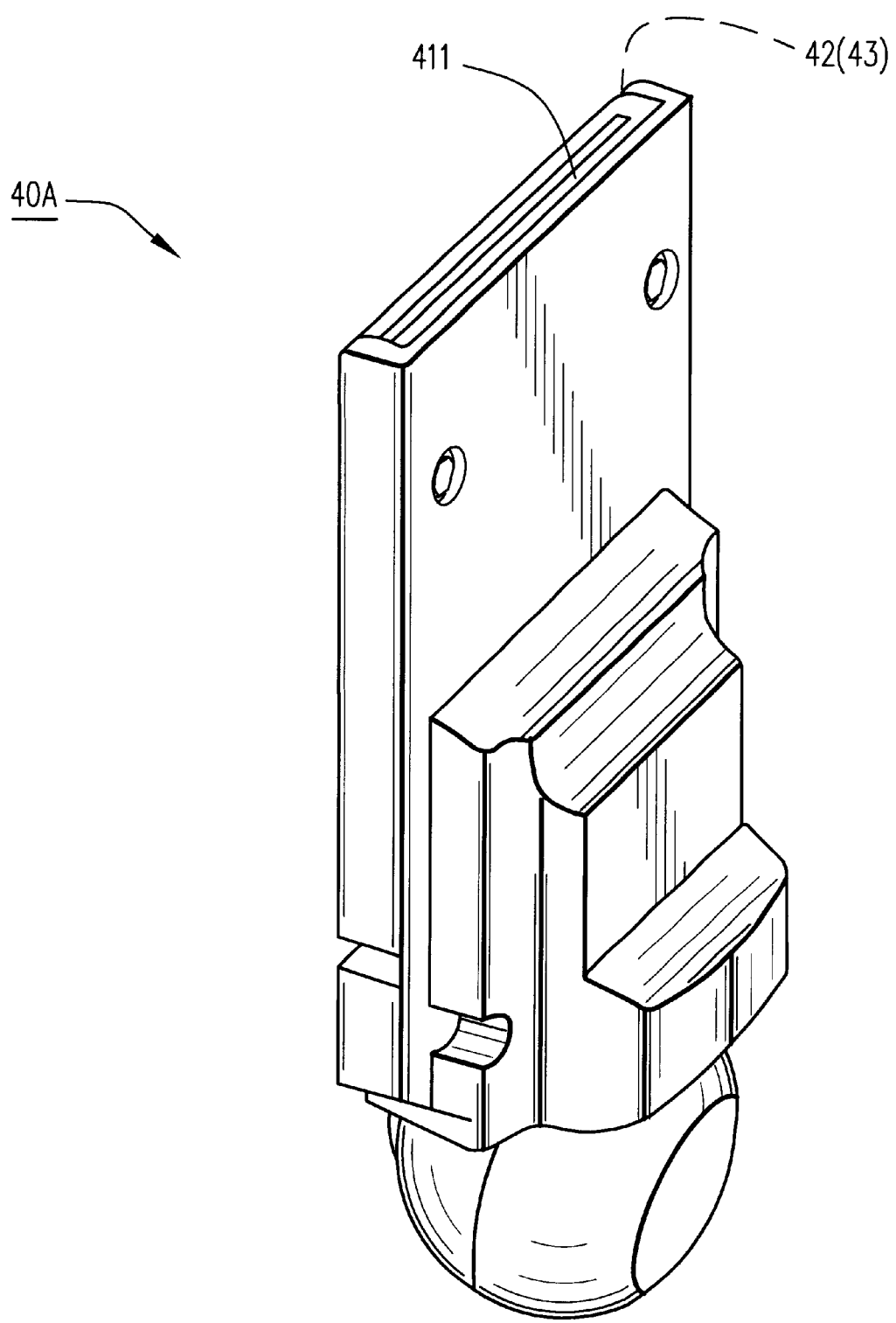
FIG. 7 is an external rear perspective view of a structure of a portable game cartridge incorporating the camera portion.
Figure 8:
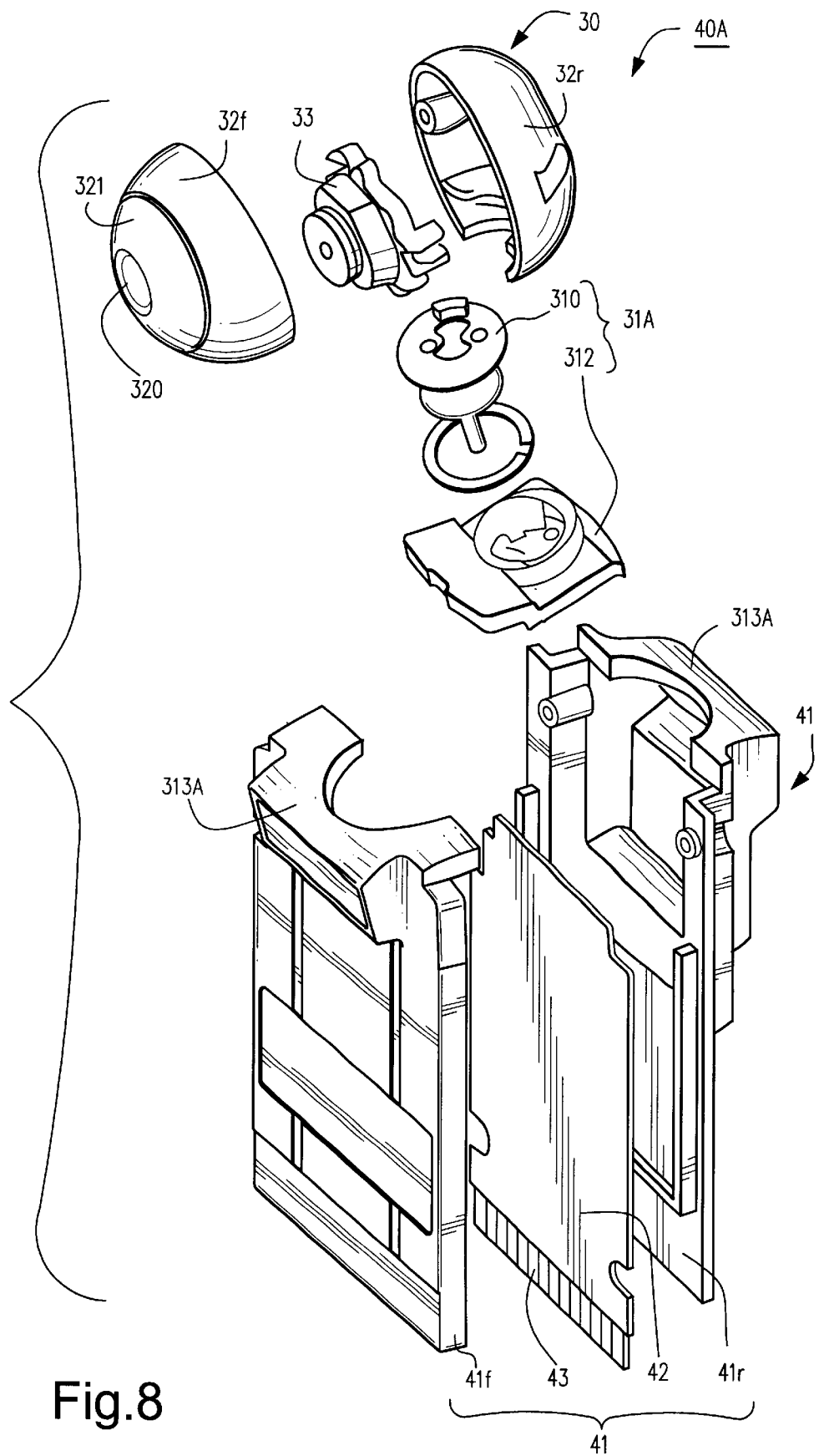
FIG. 8 is an exploded perspective view of the portable game cartridge shown in FIG. 6.
Figure 9:
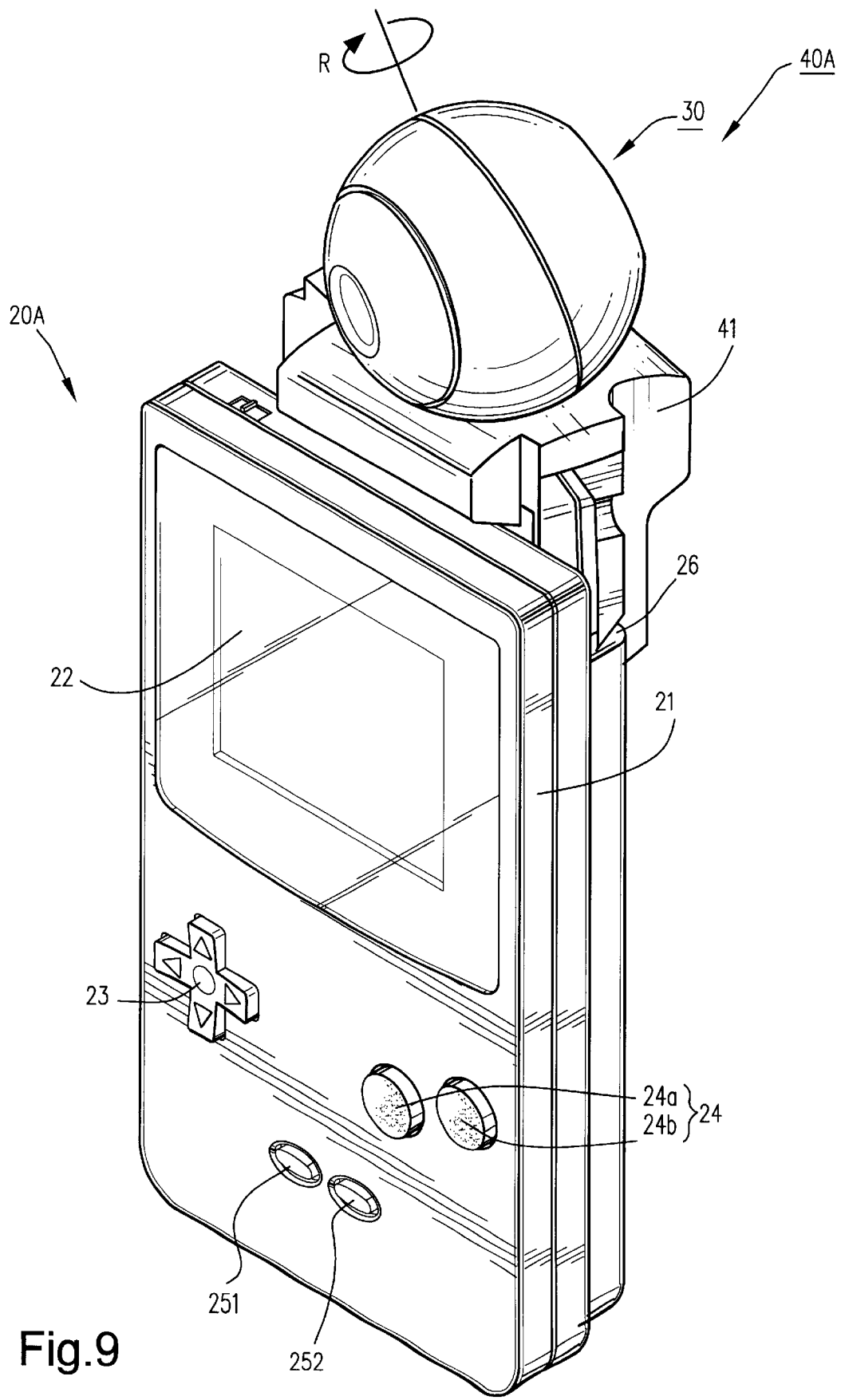
FIG. 9 is a diagram showing the portable game machine cartridge inserted in a body portion of the portable game machine.

Figure and FIG. 7 are external perspective views showing the structure of a portable game machine cartridge (hereinafter abbreviated as "cartridge") 40A according to an embodiment of the present invention. Specifically, FIG. 6 is a perspective view viewed from its front and FIG. 7 is a perspective view viewed from its back. FIG. 8 is an exploded perspective view of the cartridge 40A. FIG. 9 is a diagram showing a portable game machine cartridge shown in FIG. 6 and FIG. 7 installed in the body portion 20A.

In FIGS. 6, 7 and 8, the cartridge 40A includes a cartridge housing (hereinafter abbreviated as "housing") 41 on whose upper portion a supporting portion 31A is formed, and the camera portion 30 rotatably supported by the supporting portion 31A. The housing 41 has a flat rectangular parallelepiped shape combining a front half 41f and a rear half 41r, and a supporting protrusion 313A is formed on the upper portion thereof. An opening 411 is formed on the lower portion of the housing 41. The housing 41 accommodates a substrate 42 implementing a nonvolatile semiconductor memory (e.g., RONI, EPROM, etc.) and a write-read enable memory (e.g., RAM or other temporary memory). These memories (ROM, RAM, etc.) will be described in detail later referring to a block diagram of FIG. 13. A plurality of terminals 43 are arranged on the lower portion of the substrate 42 to electrically connect implemented electric components to the connector 27 in the body portion 20A (refer to FIG. 9). In addition, each terminal 43 is connected to one or more electric components in a suitable circuit pattern.

As shown in FIG. 9, the cartridge 40A as described above is inserted in the insertion opening 26 of the body portion 20A. The upper end portion of the body portion 20A has a flat surface without forming the supporting protrusion 313 as in the body portion 20 of the embodiment in FIG. 1.

Because the structure of the camera portion 30 and the other structure of the body portion 20A are the same as those in the embodiment in FIG. 1, the same reference numerals are provided for corresponding portions and their detailed description is omitted.

According to the portable game machine cartridge of the present invention, the user is only required to obtain a cartridge with a camera portion, because the cartridge is suitable for insertion into a game machine body that is already on the market. The cartridge with a camera portion may then be used to shoot and display arbitrary surrounding images of the user, thereby allowing expansion of the functions of the portable game machine at low cost.

Figure 10:
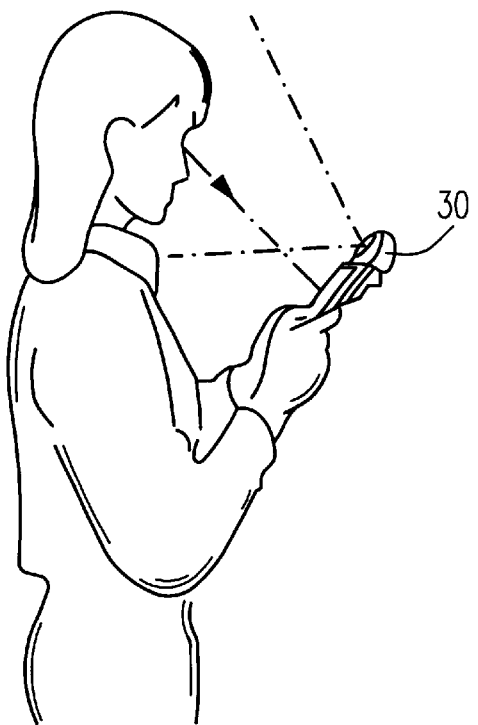
FIG. 10 is a diagram showing the portable game machine cartridge and portable game machine body in use.
Figure 11:
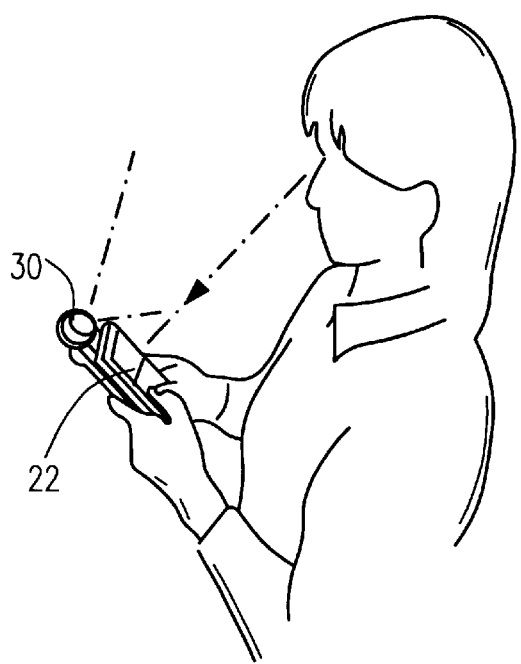
FIG. 11 is another view of the diagram shown in FIG. 10.
Figure 12:
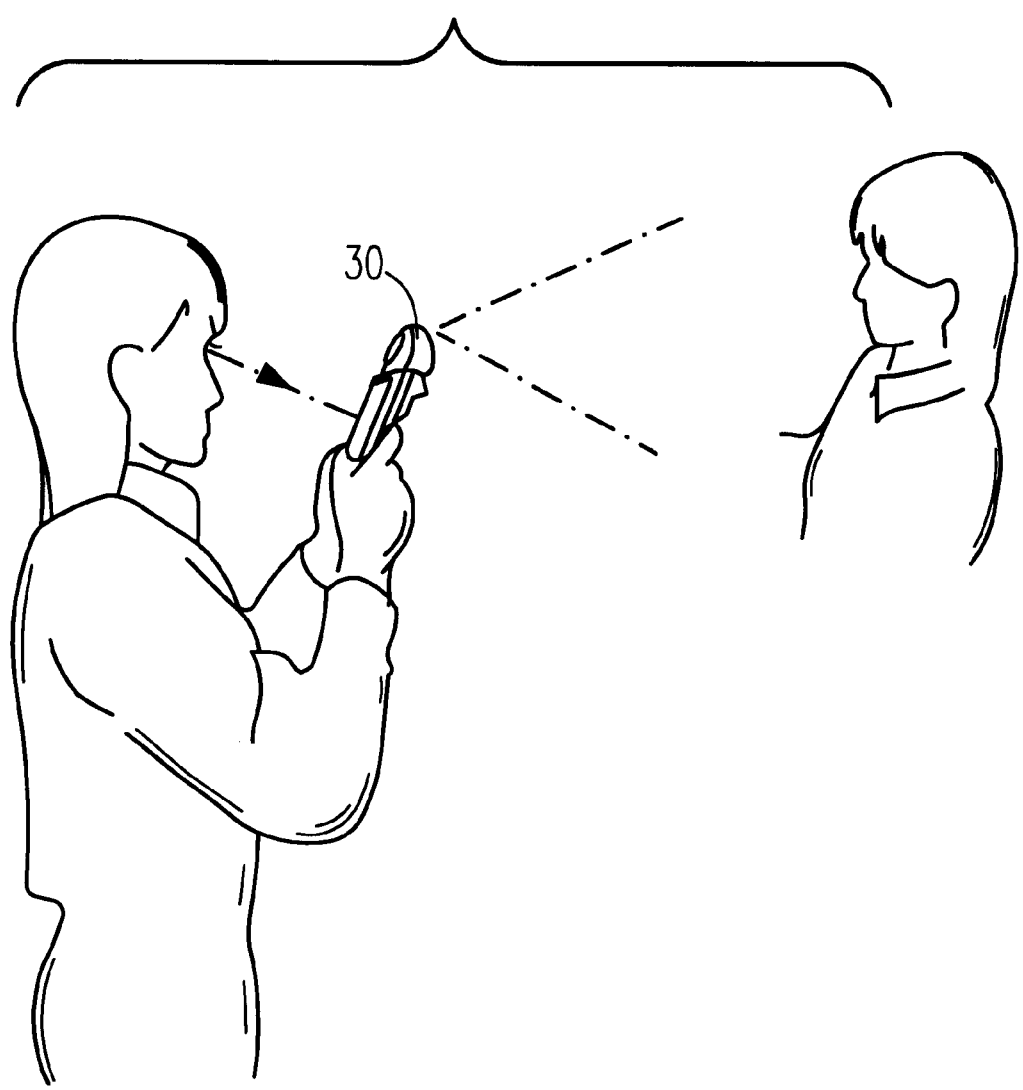
FIG. 12 is diagram showing another example of a state of use of the portable game machine and portable game cartridge.

FIGS. 10 to 12 are diagrams illustrating use of the portable game machine 10 according to an embodiment of the present invention, i.e., a state in which the portable game machine cartridge 40A is inserted in the portable game machine body in use. In particular, FIGS. 10 and 11 show a state in which the user shoots himself/herself or backward of himself/herself with the camera portion 30, and FIG. 12 shows a state in which the user shoots ahead of himself/herself with the camera portion 30.

When the user holds the housing 21 with both hands, and the image pickup device 33 points to the forward direction of one main surface (front surface), as shown in FIGS. 10 and 11, the face of the user who watches the image display device 22 and its surroundings are shot with the camera portion 30, and the shot image (the face of the user) is displayed on the image display device 22. In reverse, when the user wants to shoot the forward view or person, etc., as shown in FIG. 12, the image pickup device 33 is rotated approximately 180 degrees to point to the backward direction of the other main surface (i.e., the rear surface). As a result, the user shoots a person ahead of the user or the forward view or objects with the camera portion 30, and the shot image is displayed on the image display device 22.

Figure 13:
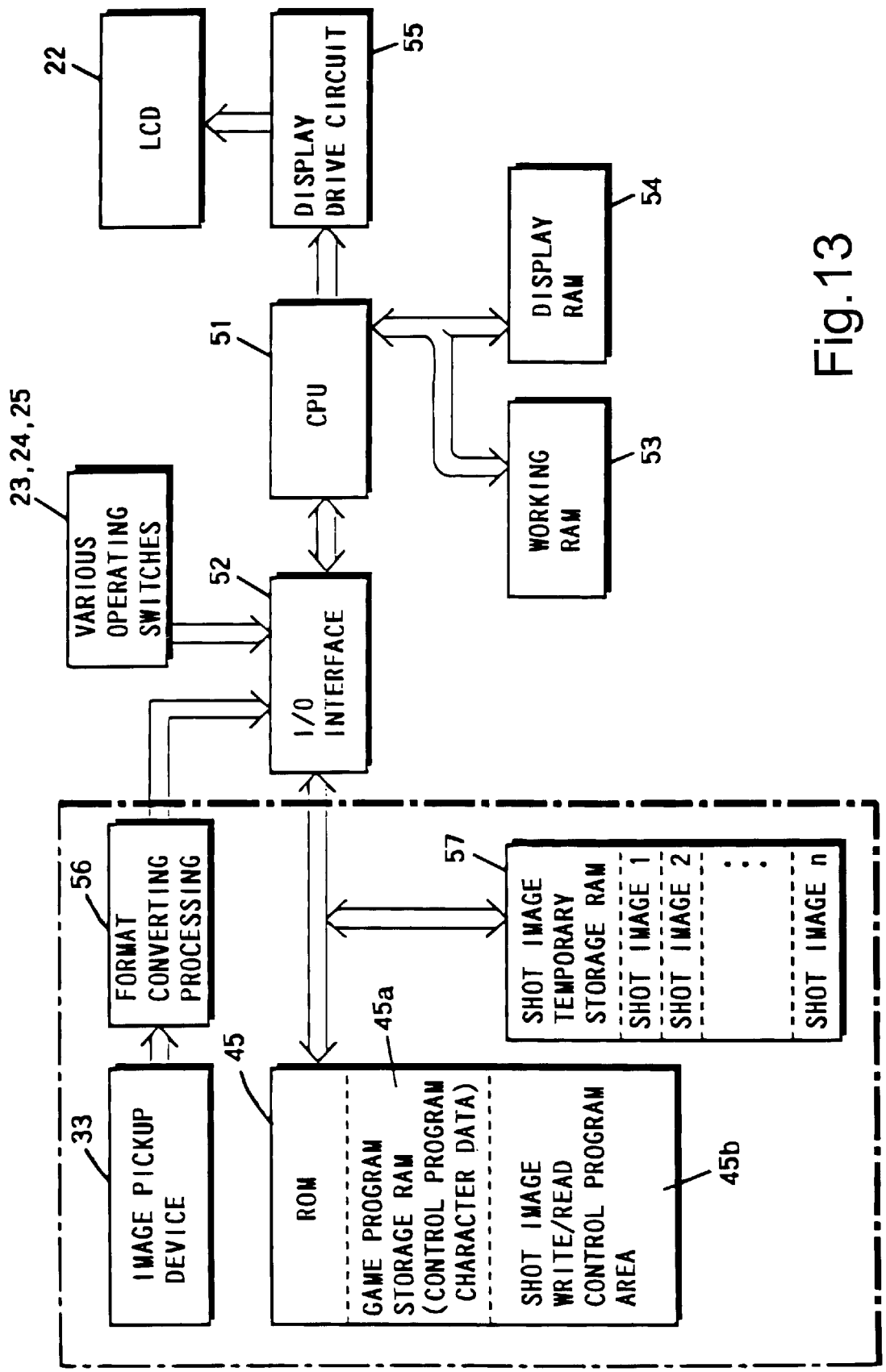
FIG. 13 is a block diagram showing the electrical structure of the portable game machine.

FIG. 13 is a block diagram showing the electrical structure of the portable game machine of one embodiment of the present invention. In FIG. 13, the body portion 20 includes a central processing unit (CPU) 51. Connected to the CPU 51 are an I/O interface (hereinafter referred to as "interface") 52, a working RAM 53, a display RAM 54 and a display drive circuit 55. Various operating switches 23 to 25 are connected to the interface 52 and a ROM (nonvolatile memory), which is an example of external storage means contained in the cartridge 40 is removably connected to the interface 52. Further, connected to the interface 52 are a format converting processing circuit 56 and a shot image temporary storage RAM (hereinafter referred to as "image RAM") 57.

Specifically, the working RAM 53 includes a plurality of storage areas (or registers) for temporarily storing various data in game process and for use in storing backup data such as scores, obtained items and lives, for example. In addition, the working RAM 53 includes a frame counter (or frame register) for counting a frame number to be written and/or read in the image RAM 57. The display RAM 54 is used for storing a character code to be displayed at a coordinate position corresponding to each stamp when the displayed screen is divided into a plurality of stamps (minimum display unit of the character) in matrix (for example, 32×30). The image RAM 57 includes storage areas for storing image data for a plurality of (n) frames shot with the image pickup device 33, and includes for each frame a character code storage area corresponding to the plurality of stamps for one frame of the display RAM 54 and an image data storage area storing image data (dot data) of each stamp.

The ROM 45 includes a game program storage area 45a similar to the ROM for use in the conventional game-dedicated cartridge, and a shot image write/read control program storage area 45b. The game program storage area 45a includes a character data storage area for storing the dot data of a plurality of characters for use in the game according to character codes and a control program storage area for storing a program for display control of the plurality of characters and various processing programs for the game. The shot image write/read control program storage area 45b stores a write (image data read) program which makes the format converting processing circuit 56 perform format conversion of the shot image with the image pickup device 33 and then writes the format-converted image data to the image RAM 57, and a read program which reads the image data stored in the image RAM 57. More preferably, the shot image write/read control program storage area 45b stores a synthesizing program for displaying an image obtained by synthesizing the image data written in the image RAM 57 and the character data for the game.

In a case where the camera portion 30 is provided on the cartridge 40A side, in addition to the ROM 45, the format converting processing circuit 56 and the image RAM 57 are contained in the cartridge 40.

Figure 14:
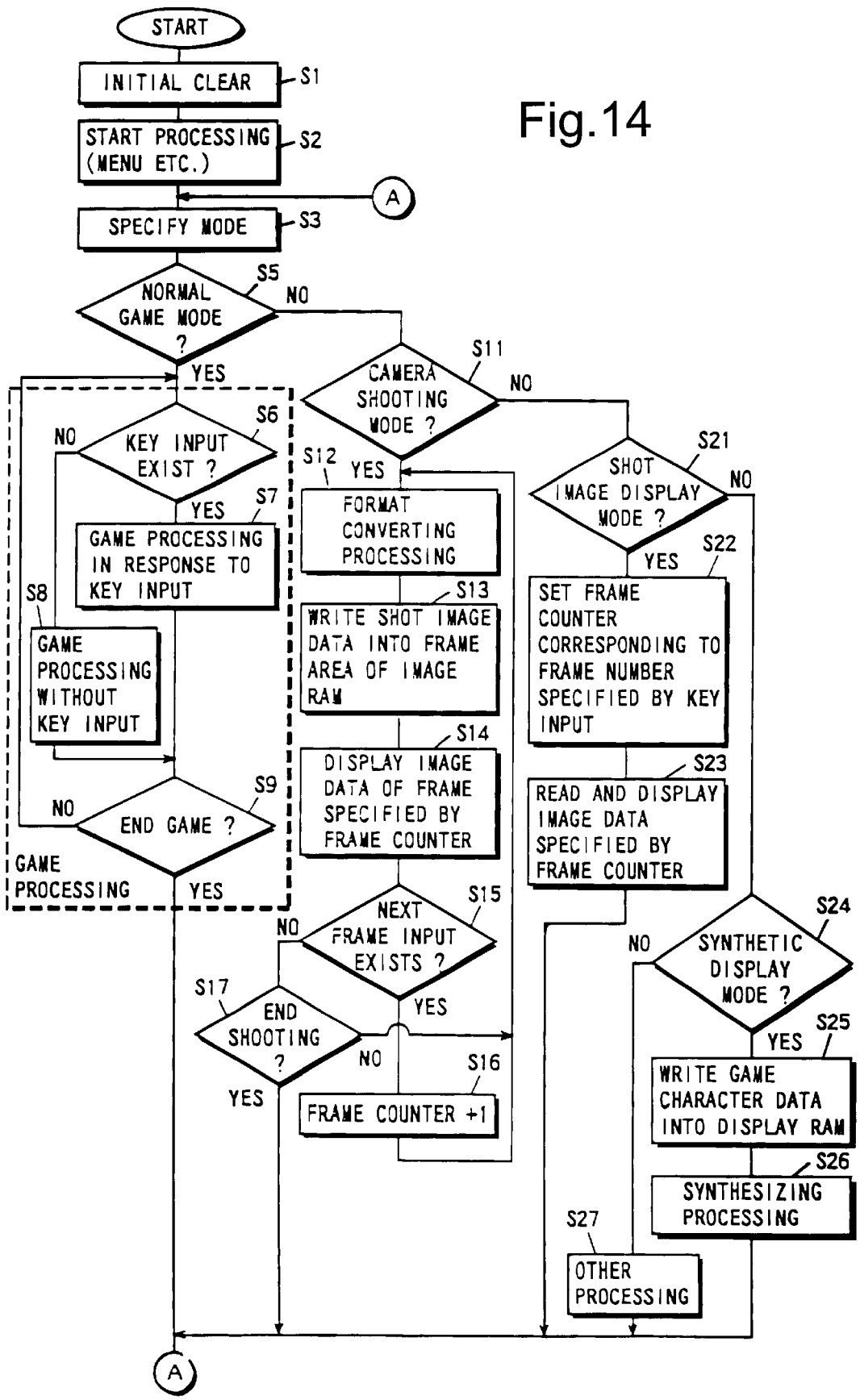
FIG. 14 is a flow chart describing the image capturing operation of the portable game machine of the present invention.

FIG. 14 is a flow chart for describing operation of the electrical circuit shown in FIG. 13. Described next is the operation of the electrical circuit shown in FIG. 13 referring to FIG. 14.

When the power of the body portion 20 is turned on, the CPU 51 starts the following operation based on the program in the ROM 45: First, at step S1, each area of the working RAM 53, the display RAM 54 and the image RAM 57 is initially cleared. Then, at step S2, start processing (menu display, transfer of the backup data to the working RAM 53, etc.) is performed. Then, at step S3, when a player specifies an operation mode (game mode, camera shooting mode, shot image display mode, etc.), the corresponding processing to the specified operation mode is performed. which will be described below.

Normal Game Mode:

In a case of the game mode, at step S3 described above, the game mode is selected. At step S5, when it is determined that the mode is the normal game mode, the CPU 51 executes game processing shown in steps S6 to S9 based on the game program stored in the game program storage area 45a. That is, the CPU 51 determines at step S6 whether or not any key input is performed. When key input exists, the CPU 51 performs at step S7 processing in response to the inputted key based on the game program. For example, when the direction instructing switch 23 is operated, the CPU 51 moves a player character in the instructed direction for display, and when the motion switch 24 is operated, the CPU 51 changes a display state of the player character into a state showing the instructed motion. On the other hand, when no key input is performed, the CPU 51 performs at step S8 game processing without key input. Next, the CPU 51 determines at step S9 whether the game ends or not, returning to step S6 when the game does not end to repeat the operations from steps S6 to S9.

Camera Shooting Mode/Shot Image Read and Display Mode:

In a case of the camera shooting mode, the shooting mode is selected at step S3 described above. In this case, after determined at step S5 that the mode is not the game mode, it is determined at step S11 that the mode is the camera shooting mode, and then the processing goes onto to step S12. At step S12, the CPU 51 provides the format converting processing circuit 56 with a conversion instructing signal. In response, the analog signals of the optical image shot with the image pickup device 3 is a format-converted into digital signals by the format covering processing circuit 56. Specifically, when one frame is structured of 32×30 stamps and one stamp is structured of 8×8 dots, the analog signals of the optical image are resolved into coordinate data of the stamps and dot data of the stamps, and then the character data of 8×8 dots is stored corresponding to each stamp character code (or character address) and also a character code to be displayed is generated at a stamp position (address) corresponding to the display coordinates of each item of the character data. At this time, when the resolution of the image display device 22 is four levels of tones for one dot, the dot data of each character is converted into data of 2 bits for one dot.

Next, at step S13, the CPU 51 writes the image data of the shot image into a storage area of the image RAM 57 corresponding to the write frame numbers specified by the frame counter. Therefore, in the frame storage area of the image RAM 57, at addresses corresponding to the character codes, the character data of each character to be displayed is stored, while at a stamp address corresponding to the display coordinates of each character, the character code of the character to be displayed is stored.

Next, at step S14, the CPU 51 reads the character codes corresponding to each stamp in the storage area of the image RAM 57 corresponding to the write frame number specified by the frame counter in order of the stamp coordinates (in order of X0Y0 . . . X31Y0,X0Y1 . . . X31Y1, X0Y29 . . . X31Y29), and then takes the read character codes as the addresses to sequentially read the corresponding character data. In this way, the sequentially read character data is temporarily stored in the display RAM 54 and displayed through the display drive circuit 55 on the image display device 22. Then, the display data for one frame is repeatedly read for each time required for display processing for one frame, and it thereby seemed as if the same image is fixedly displayed.

Next, at step S15, the CPU 51 determines whether or not next frame input is performed. When determining no input, the CPU 51 determines at the following step S17 whether or not the shooting ends, returning to step S12 when the shooting does not end to repeat operations from steps S12 to S16. On the other hand, at step S15 described above, when determining that shot image input in the next frame exists, the CPU 51 increments a count value of the frame counter by 1 and then returns to step S12, thereby writing the shot image data in the next frame storage area in the image RAM 57. Then, when the shooting ends, the CPU 51 returns to step S3 described above to perform processing of other modes.

Shot Image Display Mode:

When the shot image previously written in the image RAM 57 is displayed, at step S3 described above, the shot image display mode is selected. This is determined at step S21 and the routine goes onto to step S22. At step S22, the numerical value corresponding to the frame number specified by the operation of each switch is set in the frame counter. Next, at step S23, the image data of the frame specified by the frame counter is read from the storage area in the image RAM 57 and then displayed on the image display device 22.

Shot Image Synthetic Display Mode:

When the shot image and the character for use in the previously program-set game are synthesized and displayed (for example, when portions except a head portion are the character image of the game and the shot image of the head portion is synthesized with the character image), at step S3 described above, a synthetic display mode is selected. Then, after determined at steps S5, S11, and S21 that the mode is not a mode corresponding to each step, it is determined at step S24 that the mode is the synthetic display mode. In response, at steps S25 and S26, the image synthesizing processing is performed. Specifically, at step S25, the CPU 51 previously writes the character dot data corresponding to the character codes of the image display of the game and the character dot data corresponding to each character code in the display RAM 54. Then, at step S26, the CPU 51 cuts out to read the character code of the shot image for synthetic display and the character dot data corresponding to the character code, then writes the character code of the shot image in the coordinates for synthetic display in the display RAM 54 and also writes the character dot data corresponding to the character code and the character dot data from the display RAM 54, and thereby the image formed by synthesizing the game image set by the program and the shot image is displayed on the image display device 22.

At step S3, when a mode different from the above described modes is selected, after it is determined at steps S5, S11, S21, and S24 that the mode is not a mode corresponding the above modes, processing corresponding to other mode is performed at step S27.

In the portable game machine and or the portable game machine cartridge of the present invention, it is possible not only to simply display the shot image on the image display device 22 but also to use the machine and the cartridge for various processes. For example, an optional printer is connected to the body portion 20 to allow easy printing of the captured image. With the printer, the user may use a printing paper made having an adhesive backing to create a sticker of the shot image.

An extended connector for communications may also be provided for the game machine 10 or the body portion 20 to allow exchange of the shot image captured among a plurality of users.

When the extended connection is used, data can be transferred to a game machine different from the game machine with the camera-inserted cartridge. In this case, the shot image data may be accumulated in a memory (RAM) of a different information processing device or the game machine.

As set forth above, the shot images are generally stored in the shot image RAM 57. The captured images are accessible by the user for further action, such as, for example, hot spots, animation, doodling, and the like. For convenience, it is preferable that the shot images be displayed to the user in the form of a photo album. or other convenient and easily accessible format. Features that incorporate captured images are available to the user, and include, for example, hot spots, animation, game face, and panorama. While these specific features are described in detail herein, it will be understood that numerous like features may be implemented in the portable game cartridge having image capture ability as described above.

Hot Spots:

As generally described above, a preferred feature of the present invention is the ability of a user to associate hot spots with captured images to enhance enjoyment of the portable game machine. A hot spot is an area of the captured image, selected by the user who creates the hot spot, that is transparent to a subsequent viewer, and which has certain actions associated therewith. Thus, if a subsequent viewer discovers the hot spot, various resulting actions may occur, as defined by the creator of the hot spot. These actions include associating a sound effect with the hot spot, associating a visual effect with the hot spot, and jumping to another captured image within the captured image photo album.

Creation of hot spots will be described herein with references to FIGS. 15A–15E. After starting the hot spot routine, S150, a captured image is selected from the captured image album S152. It is noted that the captured image album may include images that have been altered using the doodle function described below, in addition to unaltered images. In the instant embodiment, up to five hot spots may be associated with each image in the captured image photo album. It will be understood that the number of hot spots is limited only by the available memory space. Accordingly, the five hot spots of the instant embodiment are intended to be illustrative only and not limiting. The creator of the hot spot chooses the number of the hot spot being created, e.g., 1–5, in step S154. It is then determined whether a hot spot corresponding to the number selected has already been created S156. If the hot spot selected has already been set-up, the user is asked whether the hot spot is to be deleted or merely changed/edited S158. If deletion is chosen, the selection is canceled and the memory associated with the selected hot spot is cleared S160. If, on the other hand, it is determined in S156 that the hot spot selected has not already been set-up, the user is prompted to select an area (i.e., coordinates) of the captured image on, which to place the hot spot S170. As noted above, the images are stored as a frame of 32×30 stamps, the stamps being made up of 8×8 dots. Accordingly, the hot spot corresponds to a stamp in which the chosen coordinates are located. The coordinate stamp in which the hot spot is placed is then stored in the hot spot memory area associated with the captured image, and the hot spot is enabled, i.e., turned on, S172.

The hot spot memory associated with each captured image will be described in detail below with respect to FIG. 20.

Next, various effects may be associated with the defined hot spot coordinates S162–S184. It is also noted that if a change to an existing hot spot is selected at step S158, the procedure described herein will also be followed.

The user is asked whether a sound effect is to be associated with the hot spot being created (or changed) S162. If a sound effect is to be associated with the hot spot, the user may select any of the pre-defined sound effects or background music (BGM) from the program memory 45 to be associated with the hot spot S174. If not, the user moves on to step S164 discussed below. In the instant embodiment, only pre-defined sounds are available for association with a hot spot. However, it is envisioned that sound may be recorded or imported from other compatible devices for use in future applications. The information linking the selected sound effect with the selected hot spot (e.g., an address of the selected sound) is then stored in the hot spot memory associated with the captured image S176. It is also noted that in the case of editing or changing the sound associated with a hot spot that has already been set up, the user may simply choose to turn off the sound effect associated with the hot spot under consideration in step S174.

Next, the user must decide whether any visual effect is to be associated with the hot spot under consideration S164. If no visual effect is to be associated with the hot spot, the user moves on to the jump selection S166 described below. If the user chooses to associate a visual effect with the hot spot, the effect is selected from a pre-defined number of effects available to the user S178 (in the case of editing, the effect may simply be turned off). The visual effects are limited in a manner similar to the sound effects as described above. Some examples of predefined visual effects include, for example, sliding the image from left to right across the display, strobing the image, splitting the image, etc. Setting the effect, as with the sound effect described above, is accomplished by selecting the effect number corresponding to the desired effect in the memory corresponding to the hot spot under consideration. However, as with the sound effects, it is envisioned that the visual effects available to the user may be expanded. The information of the effect chosen is then stored in the hot spot memory associated with the captured image selected S180.

The user is then asked whether a jump to another captured image from the photo album is to be associated with the hot spot under consideration S166. If no jump is selected, the user may set up another hot spot within the captured image that is being processed or may exit the hot spot routine S168, S186. If a jump is selected, the user selects the frame number of the captured image to which the jump is to be made from the photo album S182. As with the previously described effects, in the case of editing, the effect may be turned off in step S182. The information associated with the selected jump is then stored in the hot spot memory of the captured image S184.

Figure 15A:
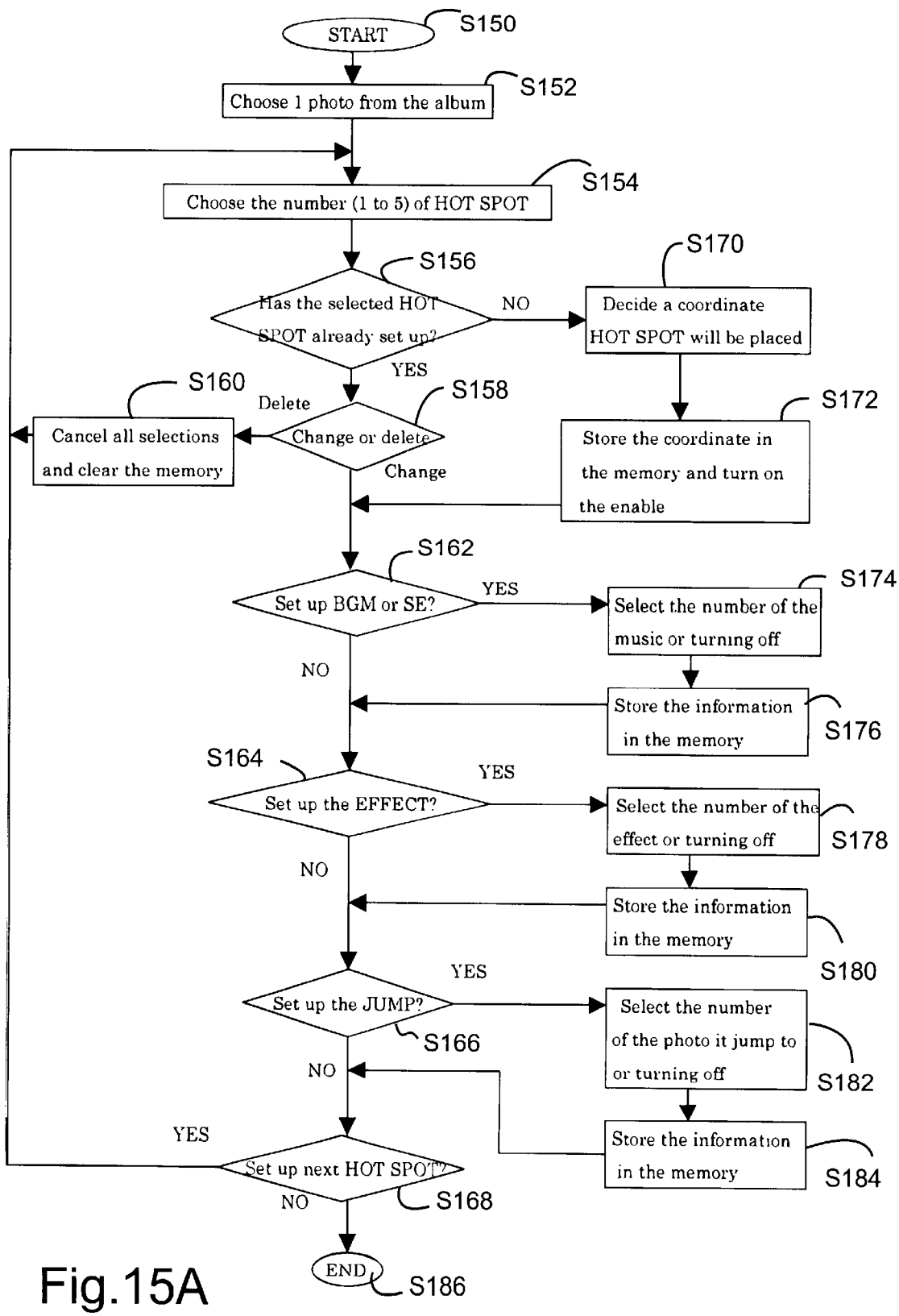
FIGS. 15A–15E are flow charts describing the hot spot feature of the present invention.
Figure 15B:
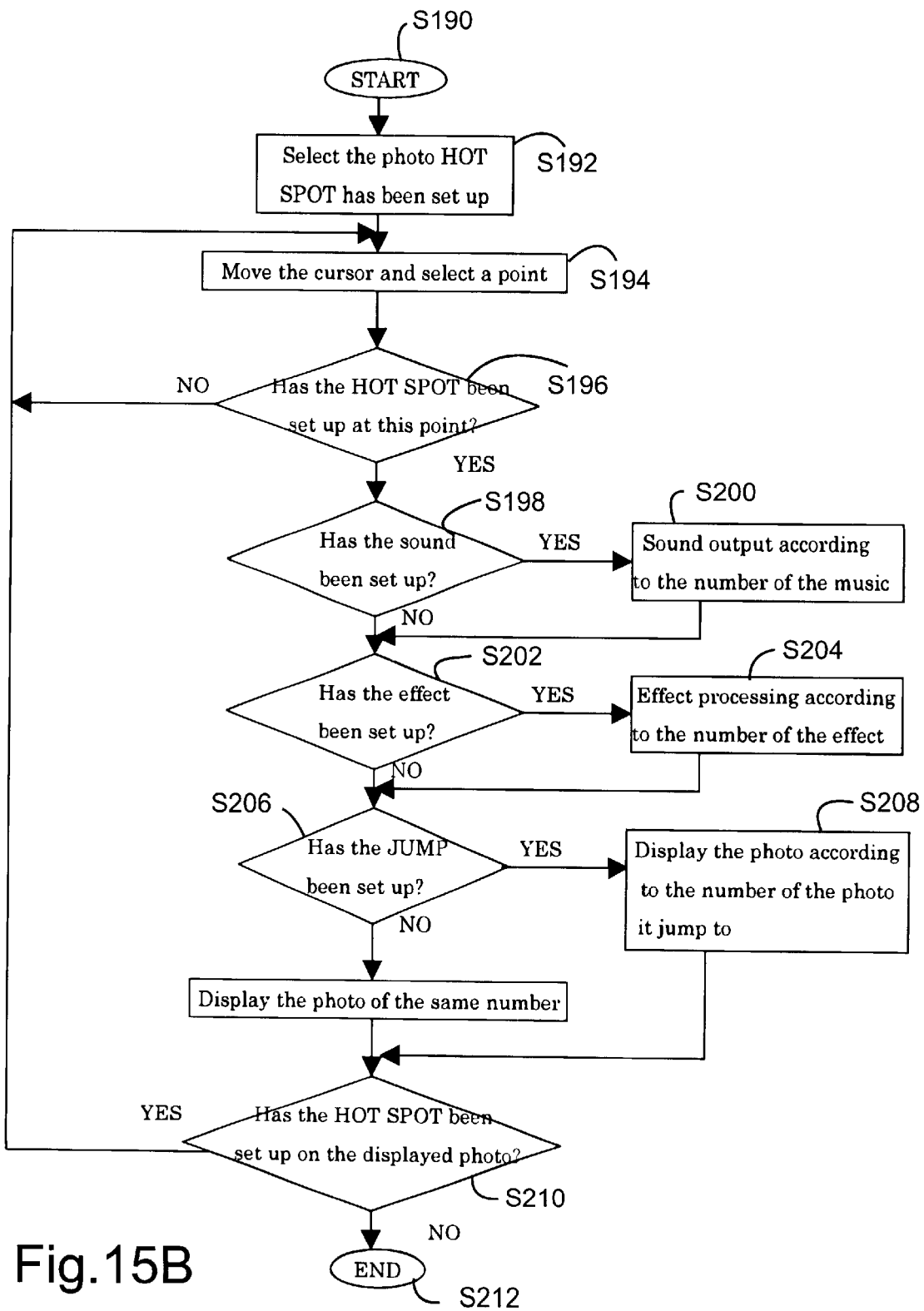

Playing the hot spot feature will be described with reference to FIG. 15B. Upon starting the hot spot play S190, the player selects an image from the captured image photo album which has hot spots associated therewith S192. The album may include an indicator that enables the player to determine whether hot spots are associated with a given image or not. The image selected by the player is retrieved and displayed on the portable game machine display device 22. The player then manipulates a cursor using the input keys described above to select a set of coordinates of the selected captured image. Upon activating the selected coordinates, it is determined if a hot spot has been set-up in the 8×8 stamp surrounding the selected coordinates S196. If no hot spot is set up at the selected coordinates, the player returns to the searching mode in step S194. If, on the other hand, a hot spot is located in step S196, the various effects associated with the hot spot are then executed. For example, if a sound effect has been associated with the hot spot S198 then the sound selected by the creator of the hot spot is played S200. Then the presence of a visual effect is determined S202, and if a visual effect is associated with the hot spot, the visual effect is processed S204. Next, it is determined whether a jump to another captured image has been associated with the hot spot S206. If not, the player can then attempt to uncover another hot spot S194, or end the game S212. If a jump has been associated with the hot spot, the captured image to which the jump is made is displayed S208. It is then determined if the image to which the previously uncovered hot spot has jumped has hot spots associated therewith. If so, the entire hot spot routine described above may be implemented. If not, the hot spot game for that image is ended S212.

Figure 15C:
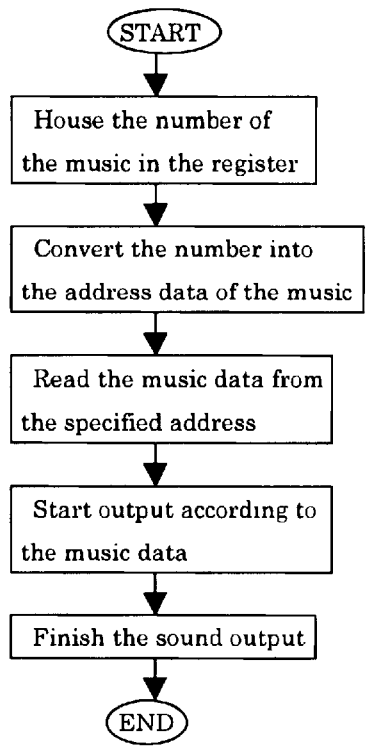
Figure 15D:
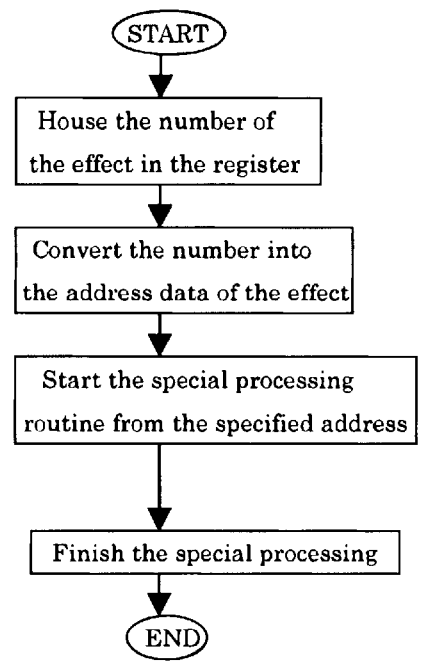
Figure 15E:
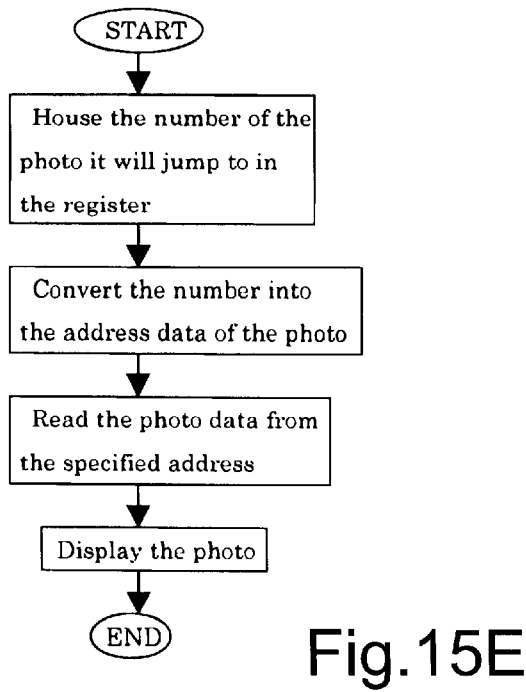

FIGS. 15C–15E generally describe the processing of each of the hot spot effects that may be associated with various hot spots. For example, the sound and visual effects are implemented by retrieving the number of the effect defined by the creator of the hot spot, and converting the effect number to an address in memory from where the effect may be retrieved and executed. In the case of the jump, as set forth in FIG. 15E, the number is converted to an address for the captured image photo album, and the image residing at that address is displayed.

Figures 20, 21:
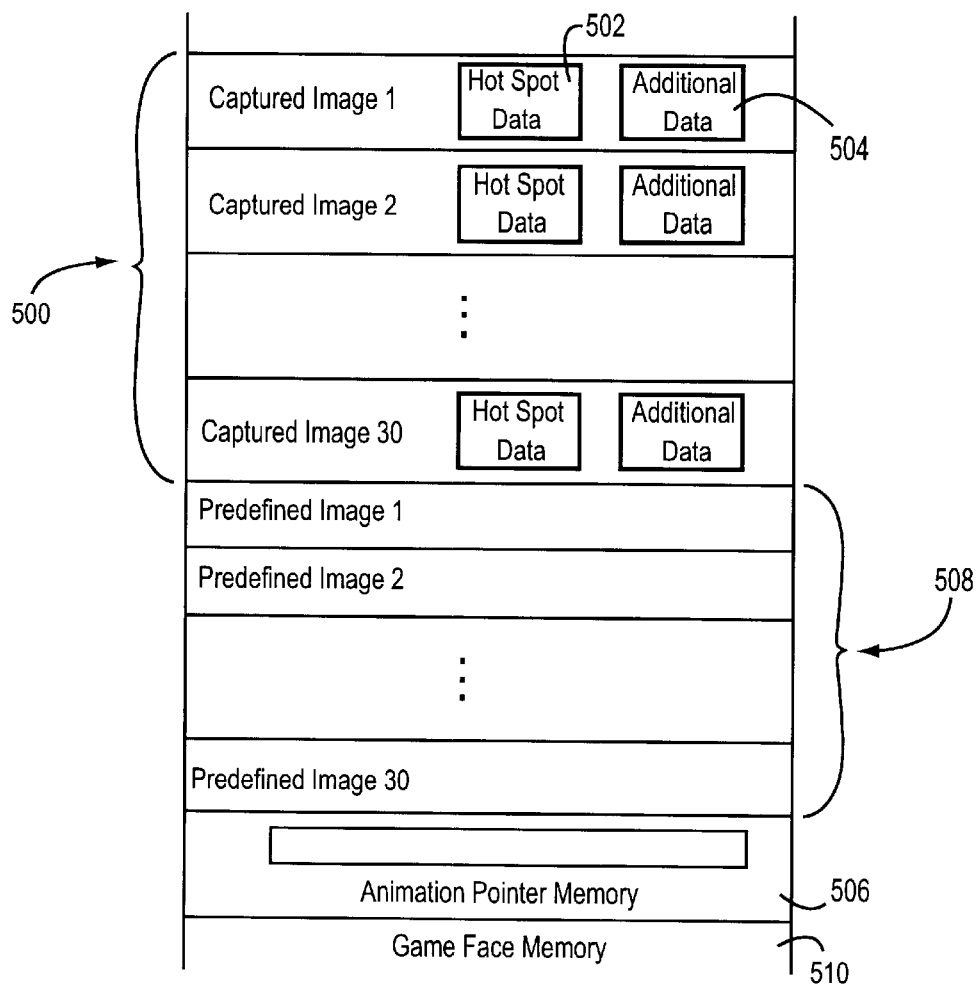
FIG. 20 is a diagram of the hot spot data structure associated with hot spot images.
FIG. 21 is a diagram of the image memory according to the present invention.

Turning now to FIG. 20, the hot spot data structure portion of the captured image memory is schematically illustrated as discussed above, there may be any number of hot spots associated with a given image. However, this number will necessarily be determined by the amount of available memory space for the hot spot feature. In the embodiment described herein, it is preferred to have the capability to include up to five hot spots with each image stored in the captured image photo album. As shown in FIG. 20, each hot spot is numbered 1–5. Associated with each hot spot are fields of one byte each, for example, which contain information associated with a given hot spot. For example, the first field (ENABLED) indicates whether a particular hot spot is activated. ON indicates activated, while OFF indicates inactive. The coordinates of the 8×8 stamp in which the hot spot is located is stored in the COORDINATES portion of the hot spot data structure. The next three fields denote the number of the predetermined sound effects, visual effects or jump frame, respectively, associated with the hot spot. In the illustrated embodiment, each captured image location in the captured image photo memory accommodates 30 bytes for hot spot data. It will be understood that any of the wide variety of data structures may be used for hot spot data, and that the embodiment shown in FIG. 20 is intended to be illustrative only.

Game Face:

Another feature of the portable game machine cartridge having image capturing capability as described above, is the use of game faces. Game faces are specialized captured images that are associated with the play of various games included in the removable game cartridge. The basic concept of the game face is to incorporate a set of captured images exhibiting different emotions or expressions into games. For example, in a juggling game, a game face of the juggler may toggle between two expressions while juggling is being successfully performed. A third expression may be used when a ball is dropped or some other undesired result or damage occurs to the player as a result of actions undertaken during game play. A fourth game face expression may, for example, be used upon termination of the game.

It will be noted that game face images are stored separately from the captured images stored in the photo album, because certain linking information must be included with game face images to ensure that they function properly in a game in which they are used. Thus, game faces cannot have links, hot spots, comments or the like associated therewith. However, game face images may be manipulated using the doodling functions described below.

Shooting of game faces is described herein with reference to FIGS. 16A and 16C. It will be noted that the illustrated embodiment uses four (4) game faces, but that any suitable number may be used. At the outset, it is noted the game faces must be shot prior to playing a game that uses game faces. If no game faces are shot, a game which uses game faces will use default images from the stamp image memory portion of the game cartridge.

When the game face shooting mode is entered S220, a counter n is set S222 to keep track of the number of game faces shot. As discussed earlier, in the preferred embodiment using four game faces, the display may be divided into four quadrants (shown schematically in FIG. 16B). Thus, the dots for each full-sized image must be thinned out so the image can be reduced to one-quarter size S224. The image area, preferably in the shape of an oval, is masked in the quadrant under consideration, and the image being shot is displayed as limited by the oval mask S226. The image in the masked portion of the quadrant being shot is constantly renewed until the image is set. If the expression is acceptable S228, the image is stored in the appropriate area of the game face memory S230, and the counter is checked S234 to determine if more game face expressions must be shot. If more images are required, the counter is incremented S232 and the process repeated until all four game faces are shot. The order of shooting, according to a preferred embodiment, is shown in FIG. 16B. If, in S228, the expression is not acceptable, the image may be recaptured until the expression is acceptable. During recapture, the counter is not incremented and the image is not stored in the game face memory.

Displaying the game face during play is described with reference to FIG. 16C. When starting the display of the game face S240, the number of the face contained in a register is retrieved S242. The retrieved number is converted into a memory address S244 and the image stored at that address is read out S246 and then displayed S248 on the display of the portable game machine.

Figure 16D:
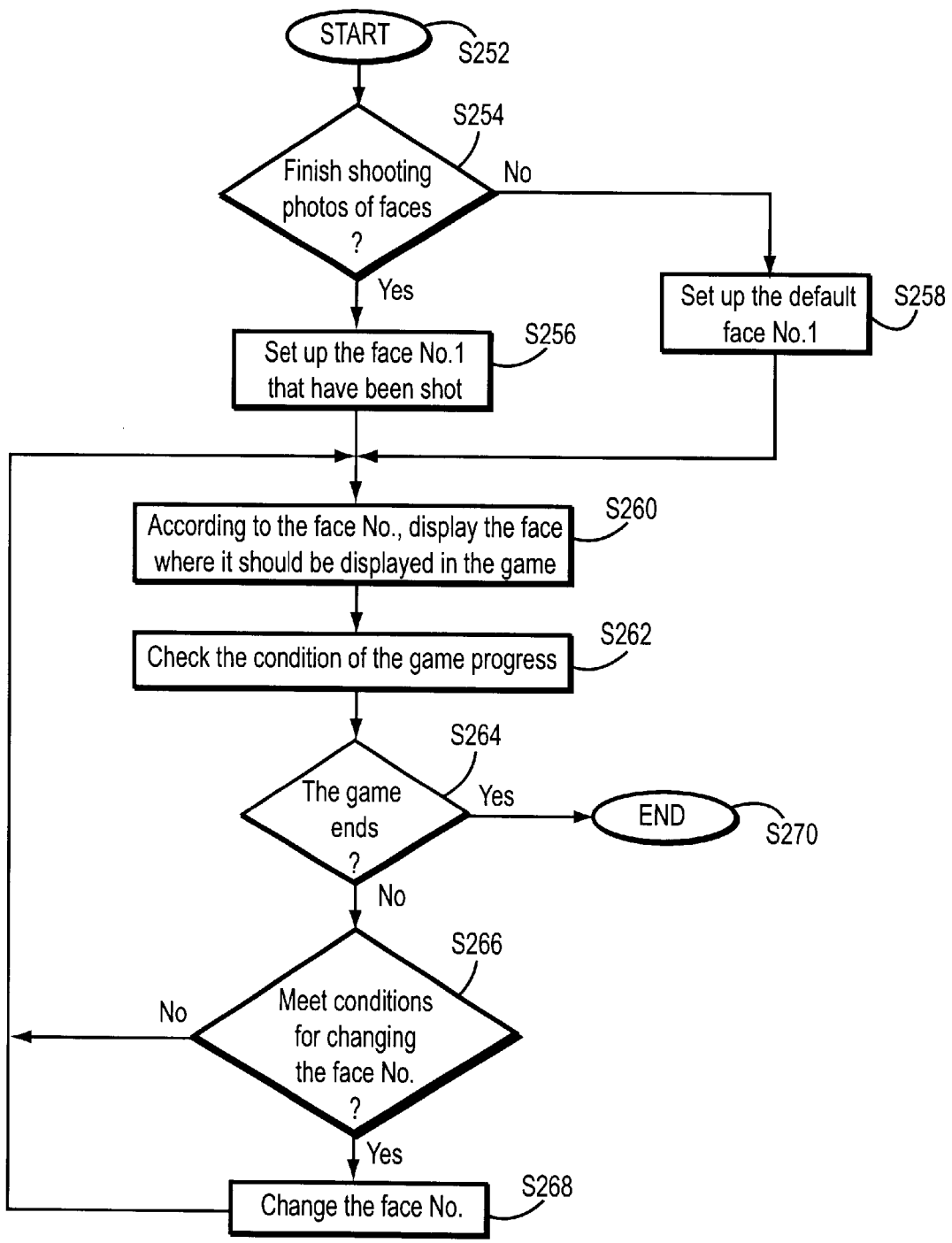

Playing a game using game faces will be described with reference to FIG. 16D. Upon starting game play S252 using game face images, it is determined whether game face images have been shot S254. If game face images have not been shot, default images from the stamp album are incorporated into the game S258. On the other hand, if game face images have been shot, these images are set-up for use in the game S256. One of the four game faces images are displayed to start the game S260. The condition of the game is checked periodically S262 to determine the status of the game. If the game ends S264, S270, then no further game faces are displayed. However, if the game continues, the game is continuously checked to see if the game face should be changed S266. If the face is to be changed, it is changed S268 based on a condition of the game being played, if not, the routine returns to step S260 and continues as described above. With reference to FIG. 16B, it is noted that in a preferred embodiment, during game play, game faces one and two are alternately toggled during normal playing conditions. Game face three is displayed when some damage or bad result occurs, and game face four is displayed at the end of the game. Of course, it will be understood that such ordering is illustrative only and that any variation would be well within the scope of one ordinary skill in the art.

Animation and Loops:

Another feature of the present invention is the ability of the user to compose a series of captured and pre-defined images into an animation. The animation may be made up of a logical sequence of frames that simulate motion, or may be any arbitrary sequential display of images that are stored in the memory of the removable game cartridge. In addition, the present invention provides the added feature of looping pre-selected portions of an animation, or the entire animation itself.

Figure 17A:
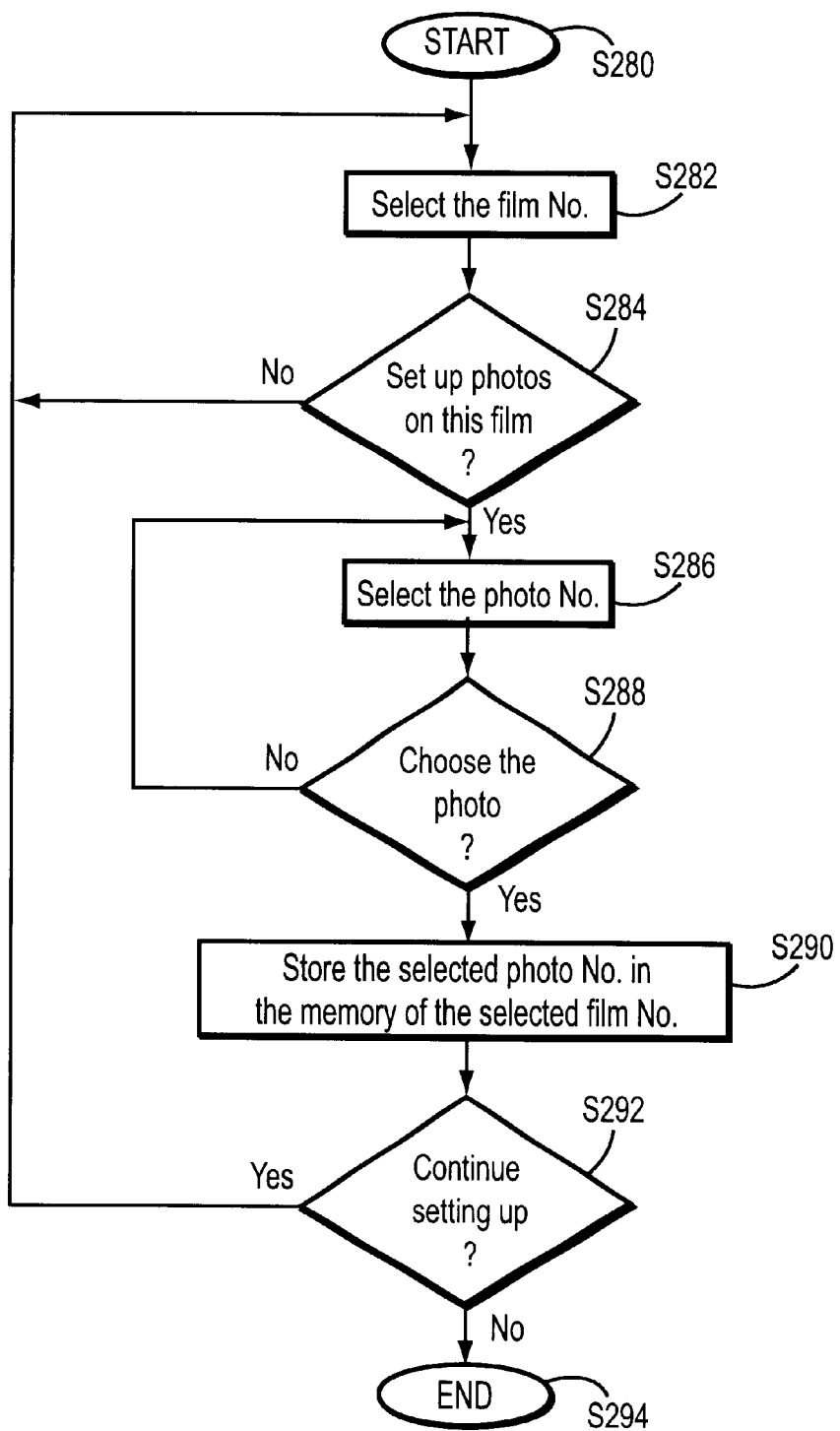
FIGS. 17A–17C are flow charts describing the animation feature of the present invention.
Figure 17B:
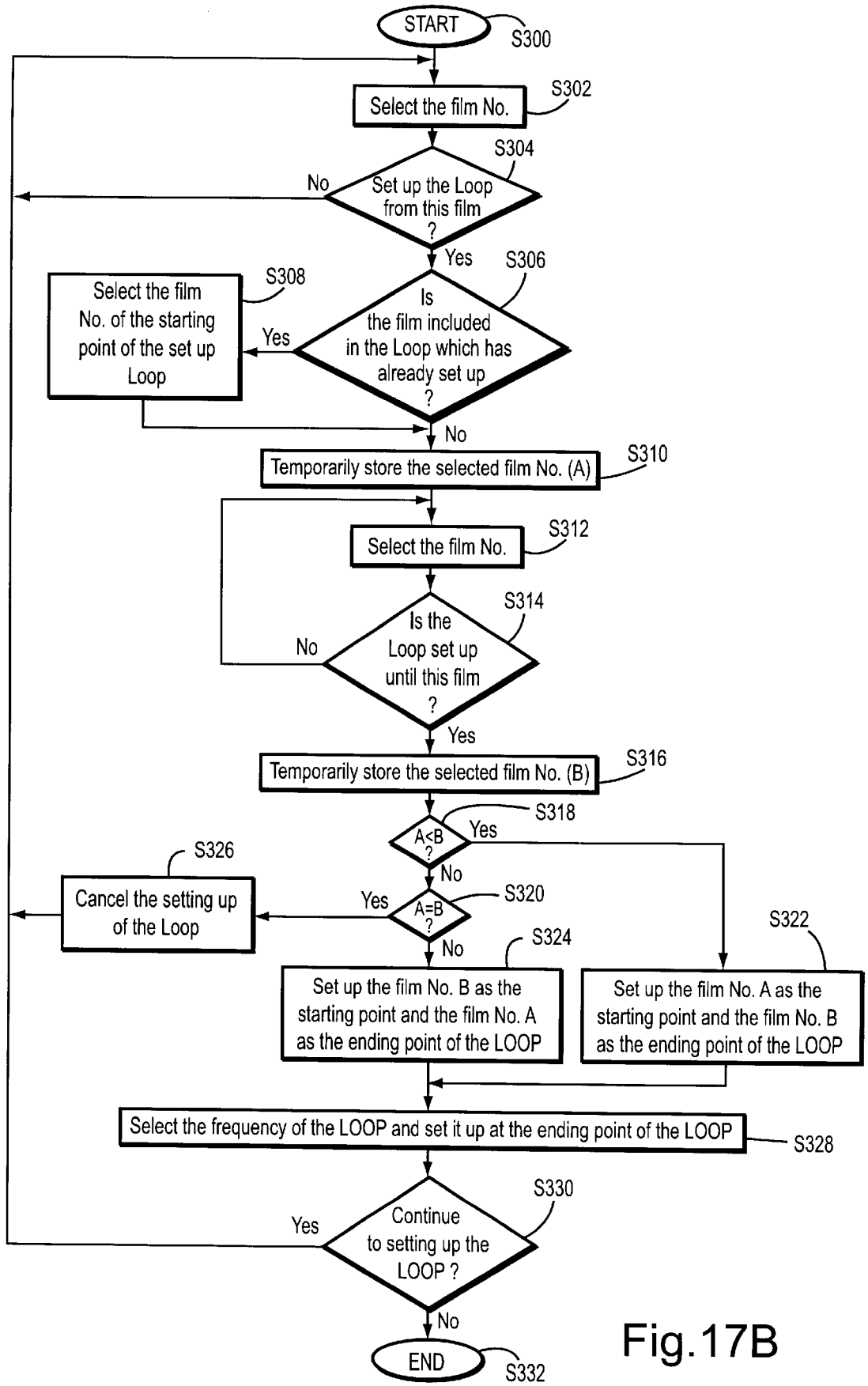
Figure 17C:
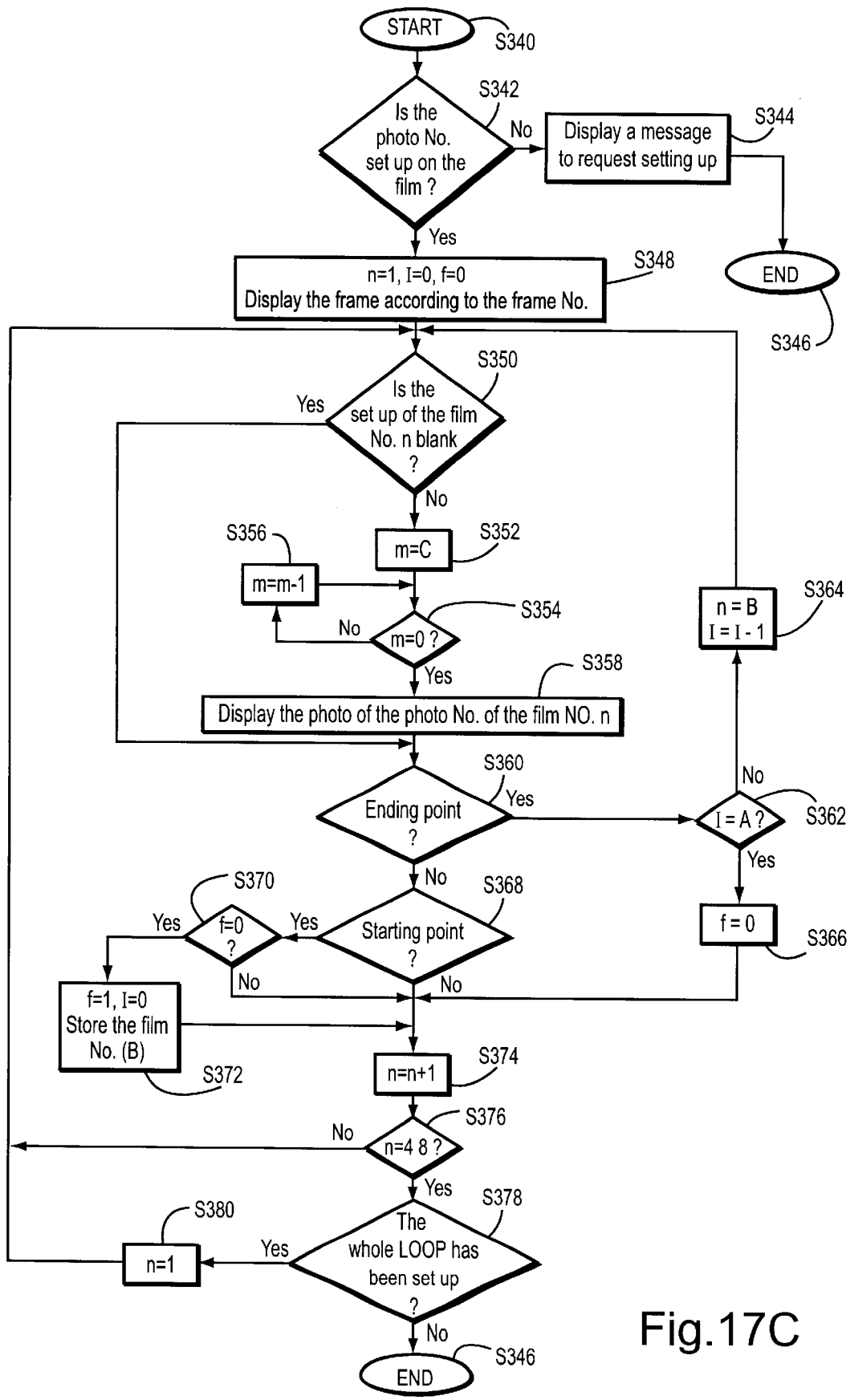

Animation set-up, loop set-up and play are described herein with reference to FIGS. 17A–17C. Upon starting the animation set-up S280, the animation set-up screen is shown on the display on the portable game machine. The animation screen shows three strips of film at the bottom portion of the display. Each film has number of frames associated therewith. Each of the frames may be assigned an image from the image memory of the portable cartridge. It is noted, that the image memory includes images captured by the user, and the pre-defined images (i.e., the stamp image memory) provided in the portable game cartridge.

After starting, the user may select the frame number S282 in which images are to be incorporated. If no images are to be added, subtracted or changed on that particular frame S284, the user is then asked about the next frame. If images are to be set-up with the selected frame, the photos are selected S286 for incorporation into frames that make-up the animation S288, S290. This process is continued to S292 until the animation set-up is complete S294. It is noted that up to forty-seven images may be used to define an animation. However, the number of images or frames that may be used is dependent upon memory size and processor spread, and thus, while the preferred embodiment uses a maximum of forty-seven frames, any number of frames may be used. It is also noted that, according to a preferred embodiment of the invention, the animation memory comprises a set of pointers that point to various images that make up the frames of the animation. In this manner, a separate image memory for the animation feature is not required, thereby reducing memory requirements of the portable game cartridge.

A subset of animation referred to as loops may also be implemented using the animation set-up of the present invention. Loops are subsets of an animation that has already been set up. Selected frames within the animation define a loop. An example of a loop set-up is shown in FIG. 17B.

A loop can be defined to be the entire animation, or any subset thereof. If the loop is chosen to be the entire animation, the loop function is simply an ON/OFF function. However, if the loop is selected to be a subset of frames within the animation that is less than the entire animation, then a loop set-up procedure as set forth in FIG. 17B is implemented. Generally speaking, loop set-up involves setting the frame number at which looping starts, the frame number at which looping ends, and a looping frequency.

According to a preferred embodiment of the present invention, loop set-up is illustrated with reference to FIG. 17B. Upon starting the set-up S300, the user is asked to indicate the frame number of the frame to be associated in the loop S302. This frame is temporarily stored in memory location A S310. If the selected frame is included in a loop that has been previously set-up S306, then the starting point of the previously set-up loop in which the frame is located is temporarily stored at location A. Otherwise, the user is asked to select beginning and ending frames to define the loop S310–S316. The ending frame is temporarily stored in memory location B.

To avoid playing frames with the loop in an incorrect order, the starting point and ending point must be determined. In essence, the frame numbers temporarily stored in A and B are compared and the lower frame number is chosen to be the starting point and the higher frame number is set to be the ending point. If the first selected frame has a frame number that is less than the last selected frame number S318, the loop is set-up as starting with the first defined frame and ending with the second defined frame S322. If, on the other hand, the second frame has a frame number that is less than the first selected frame number, the second defined frame is set to be the starting point of the loop and the first defined frame number is set to be the ending point of the loop S324. If the user selects this same frame to be the starting and ending point S320, the current loop set-up routine is automatically canceled S326, and the user is required to start over. Flags are inserted at the starting and ending frame numbers of the loop.

Once the starting and ending points of the loop have been defined, a frequency of loop play is selected by the user S328. Loops provide the user with the ability to show selected portions of the animation and may continually show this loop at a set frequency. The loop frequency, according to a preferred embodiment, is associated with the ending frame of the loop.

Animation play is described here with reference to FIG. 17C. Initially, upon entering the animation play function, it is determined whether an animation has been set-up S342. If no animation has been set-up, the user is requested to set up an animation prior to using the function S344. If it is determined that S342 that an animation has been set up, various counters and variables are initialized S348. For example, the frame number counter n is set to one, the loop counter 1 is set to zero, the loop flag f is set to zero. If the set up frame number n is blank, than a jump to determination of whether a loop exists is performed S350. If the frame number is not blank, the speed counter m is set to the viewing speed C, and decremented until it reaches zero S352–S356 before the next frame of the film is displayed S358. The routine then determines if the displayed frame is an end point of the animation or loop S360. If the frame is an end point of the loop, the loop counter is checked to determine if it is equal to the loop frequency, A S362, selected previously. If the loop frequency A is not equal to the loop counter 1, the loop counter 1 is incremented in the film number n is set to be the starting point B, and the loop is replayed.

If it is determined that an end point S360 is not reached, then it is determined whether the frame is a starting point of the animation S368. If it is, the loop flag f is checked to determine if the frame is the start of the loop S370. If the frame is a start of the loop, the loop f is set to one and the loop counter is initialized to zero S372. The film number is incremented S374 and checked to determine if it is at the end of all frames S376. If this is the case, the last frame (i.e., frame number 47), the routine determines if the entire animation defines a loop S378, and if so, resets the film umber n S380, and continues the play routine for how ever many loops have been chosen. If the film number n is the last frame, and no repeat has been selected, the play ceases S346.

It is possible that there may be blank frames in which there is no image to be displayed. In this case, all blank frames should be skipped. Frames that have images associated therewith will, of course, be processed. However, time adjustments will be made in accordance with selected speed values to make up for blank space.

In summary, the loop processing begins by checking to determine whether a flag has been inserted at the staring point. If a flag has been set at this point, the loop frequency is compared with the number of loops that have actually taken place. If the loop frequency is equal to the number of loops that have actually been played, the loop flag will be reset to zero, at which point the processing of the next frame will begin. If the loop frequency is greater than the number of loops played, the loop counter is incremented and the loop replayed from the starting point. When processing the next frame (e.g., frame 47 in the preferred embodiment). If the end is not yet reached, continue display processing, if the end is reached, then stop.

Doodle Function:

The present invention also provides a doodle function that allows the user to manipulate the captured images or to create arbitrary drawn images. There are two primary means of doodling. One is to draw or paint lines comprised of dots on to the captured image using the control keys of the portable game machine, and the other is to incorporate predefined images into the captured image in the form of stamps (i.e., cutting and pasting).

Figure 18A:
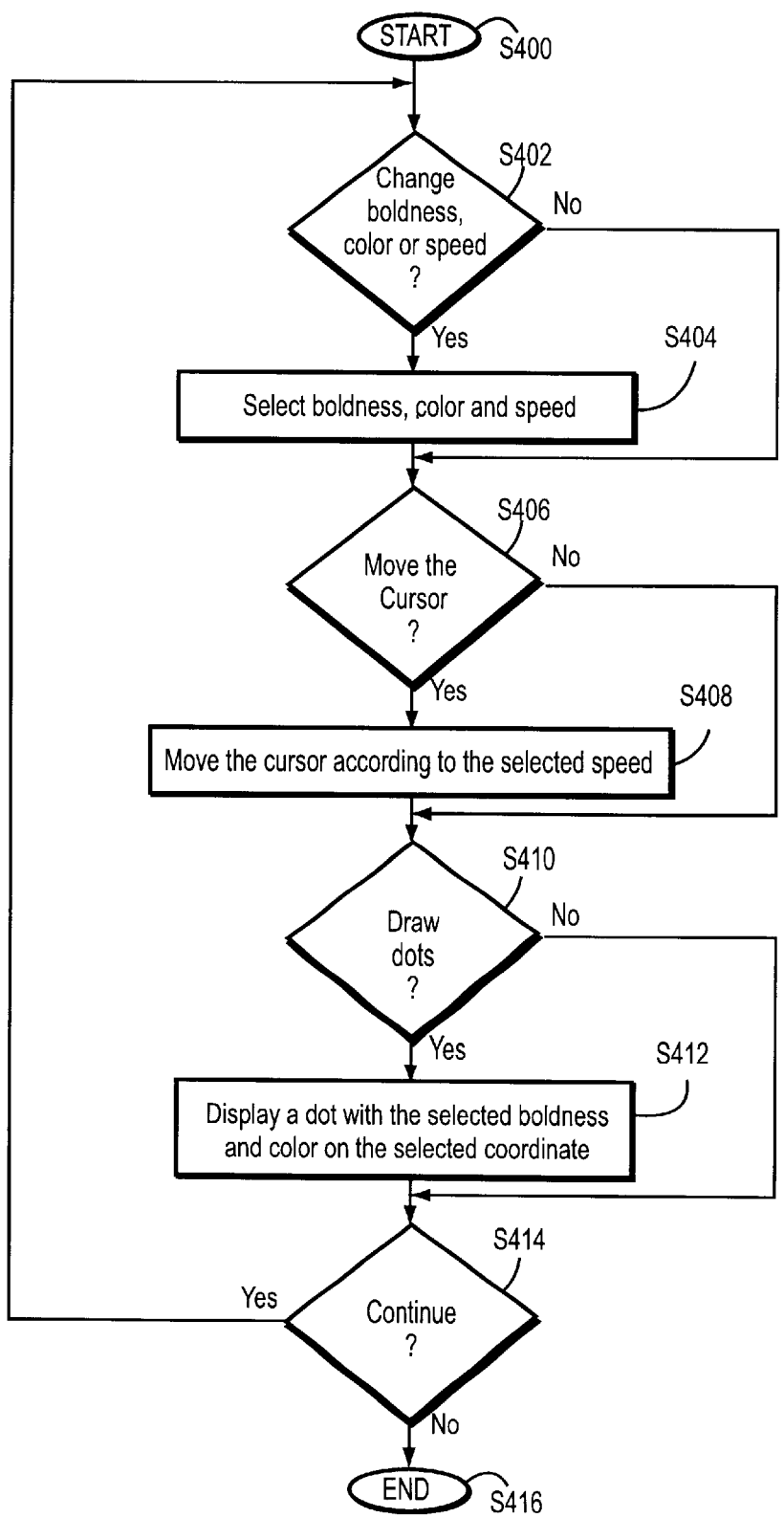
FIGS. 18A–18C are flow charts describing a doodling function of the present invention.
Figure 18B:
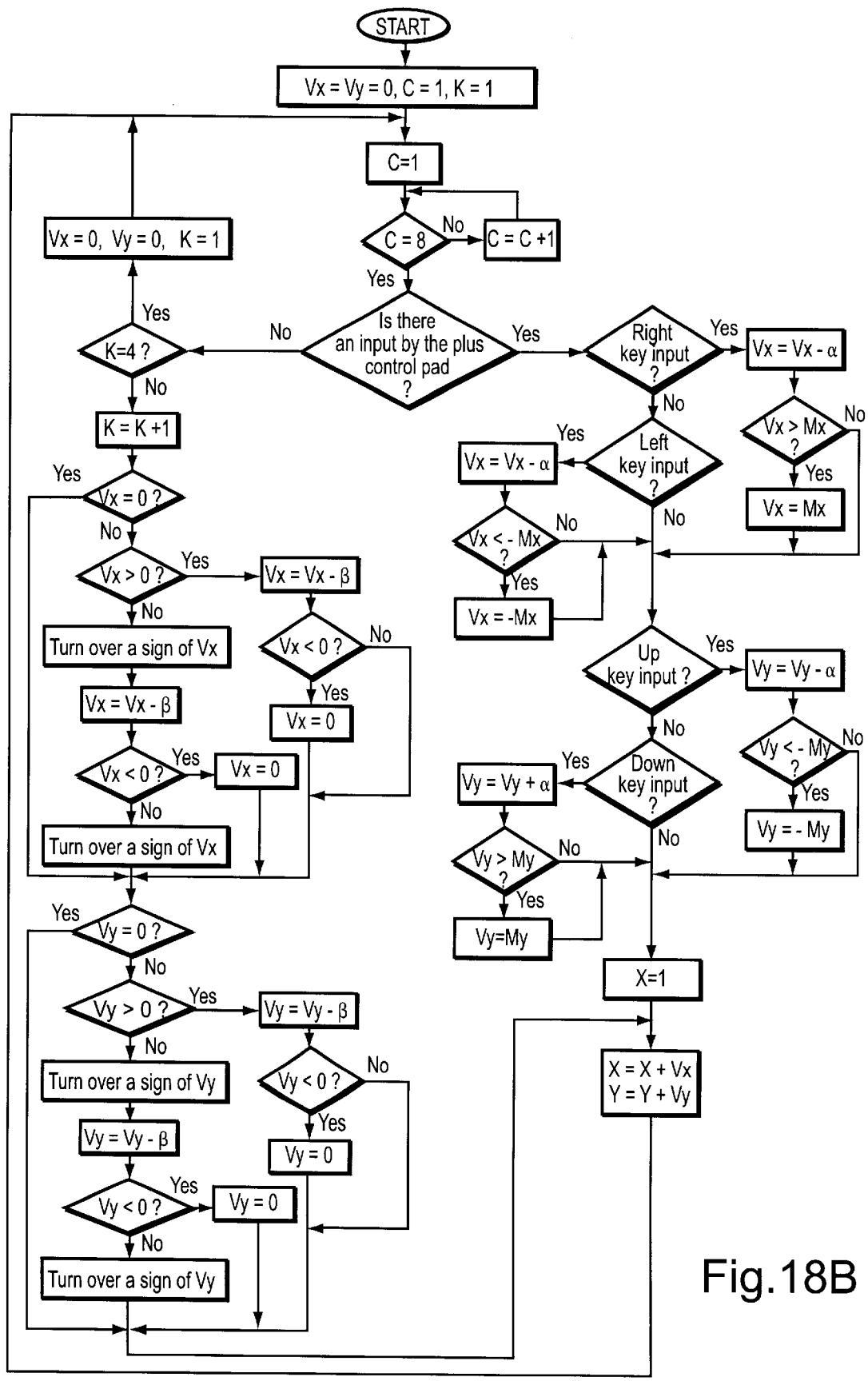
Figure 18C:
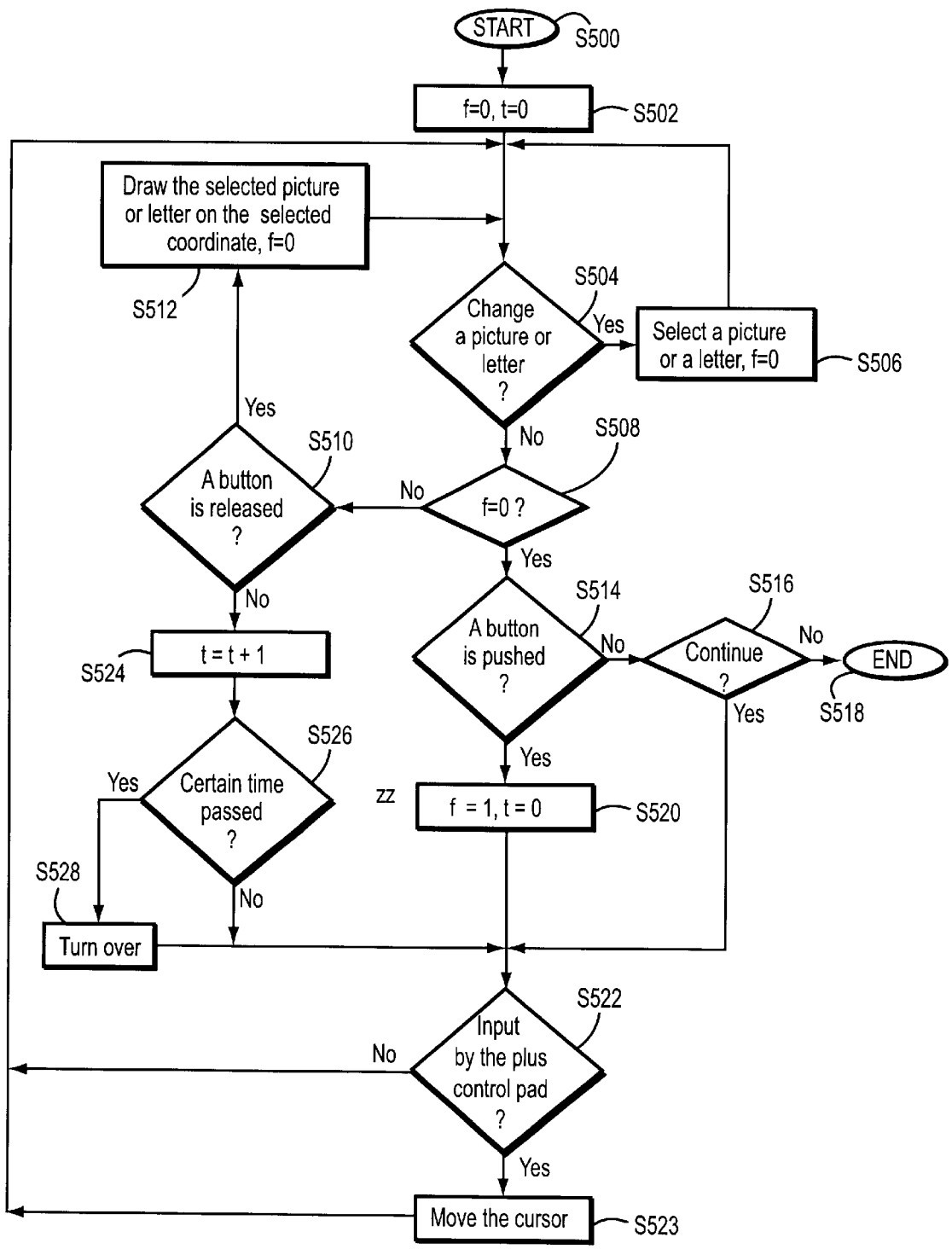

The doodle function will be described in detail here and with reference to FIGS. 18A–18C. FIG. 18A is a flow chart illustrating the paint or drawing function of the present invention. Upon entering the draw/paint function S400, the user is given the option of manipulating the shading and width of the lines to be drawn, in addition to selecting the speed of the cursor S402, S404. It will be appreciated that more advanced users may prefer higher drawings speed, while novices may require slower speeds, at least initially. Upon selecting the characteristics of the lines and cursor speed, the user may manipulate the cursor and select the buttons of the portable game machine to draw lines on the pre-selected captured image that is being processed S406. The user may also choose to put only selected dots having selected shading and size onto the image being manipulated S410, S412.

An important feature of the present invention, is the ability of the user to accomplish the drawing features using the buttons that are already available on convention hand-held portable game machines. Details of cursor control are shown in FIG. 18B. It will be appreciated that one of ordinary skill in the art, viewing the flow chart on FIG. 18B, would be able to implement the cursor control of the present invention without undue experimentation.

In summary, if the cursor key is depressed continually, the cursor will move according to the direction and selected speed. There is also some inertia present, thus, the cursor will not stop immediately upon release of the input key. The cursor is initially stationary, i.e., both the X and Y constituents ($V_x$, $V_y$) of the speed of movement of the cursor are zero. Next, the key input must be assessed to determine cursor movement. In the preferred embodiment described herein, it will be understood that key input will frequently be accepted and assessed, and the reaction of the cursor will speed up if the drawing speed is set to be fast. Conversely, the reaction of the cursor will slow down if a slow setting is used. The speed of the reaction has no bearing on the maximum values ($M_x$, $M_y$) for cursor movement speed or acceleration (a).

Turning now the processing of key input upon acceptance evaluation of key input, with processing in the direction of the X axis, if the right key is depressed, acceleration will occur in the positive direction. Acceleration a is added to speed constituent $V_x$ in the direction of the current X axis, and the resulting speed is checked to determine if it is in excess of the maximum $M_x$. Similarly if the left key is depressed, movement of the cursor will occur in the minus, or negative direction. In this negative case $V_x$ is compared to $-M_x$ to determine if maximum speed has been reached. Processing in the direction of the Y axis is similar to that of the X axis, but using the upper and lower keys. Once key input has been completed, the counter K, which counts the number of times in which key input has not taken place, is reset, and the assessment of key input is continued.

Where there is no key input (i.e., K>4 counts) the initial speed is returned to zero. If K<=4, K is incremented and inertia processing is performed. Inertia processing is carried out in the X and Y directions. If the speed in any direction is zero, inertia processing will not occur. If the speed is not zero in either direction, deceleration factor b is subtracted from the speed V. If the value obtained by substituting b from V is zero or less, V is set to zero. If the resultant value is positive, deceleration processing is continued until V becomes zero for both X and Y directions.

The stamp function will be described herein with reference to FIG. 18C. Upon entering the stamp routine S500, a flag f indicating the actuator state of the stamping portions of the portable game machine and a flag t are initialized S502.

The captured image to be manipulated is selected from the captured image photo album and the user selects a pair of coordinates where a stamp will be incorporated, using the cursor. The user than accesses the stamp album to select a stamp S506. When the button is released S510, the selected stam[0014] is placed on the captured image being manipulated S512 at the coordinates indicated by the user. The process is repeated until the user is finished stamping S514–S518. There are also timers that time out when a user does not select a stamp in a predetermined time period, or the cursor is not moved within a predetermined time period.

It is noted that the images from the stamp album are fixed and that no other images may be stored in the stamp album. However, stamps themselves can be changed and stored in the captured image photo album as separate images.

Panorama:

Another feature contemplated by the present invention is the provision of combining captured images to produce an image up to four times larger than a single frame of an one image that may ordinarily be captured. To take such larger pictures for subsequent printout, the panorama function may be used. The panorama function may use a number of frames either vertically or horizontally to create a panoramic or combined image. In the instant example, up to four images may be used to form a panorama. It will be appreciated that a panorama may be made up of any number of frames, and that the four frames referred to herein are merely illustrative of a preferred embodiment of the invention. Panoramas may be saved, but not cannot be used with certain other features, such as, for example, hot spots, animations, and the like, because of the various linking information required to keep the panorama in tact.

When shooting a panorama, a portion of the first frame may be used as a backup for shooting the second frame, and a portion of the second frame may be used as a back-up for shooting the third frame, and so on, to ensure proper alignment of adjacent frames that are used to form the panorama.

Panoramas are primarily used to capture images that are large, and which, therefore, cannot be contained in a single frame, and are typically printed out via a thermal printer onto paper that has an adhesive backing to form a sticker, or the like.

Figure 19A:
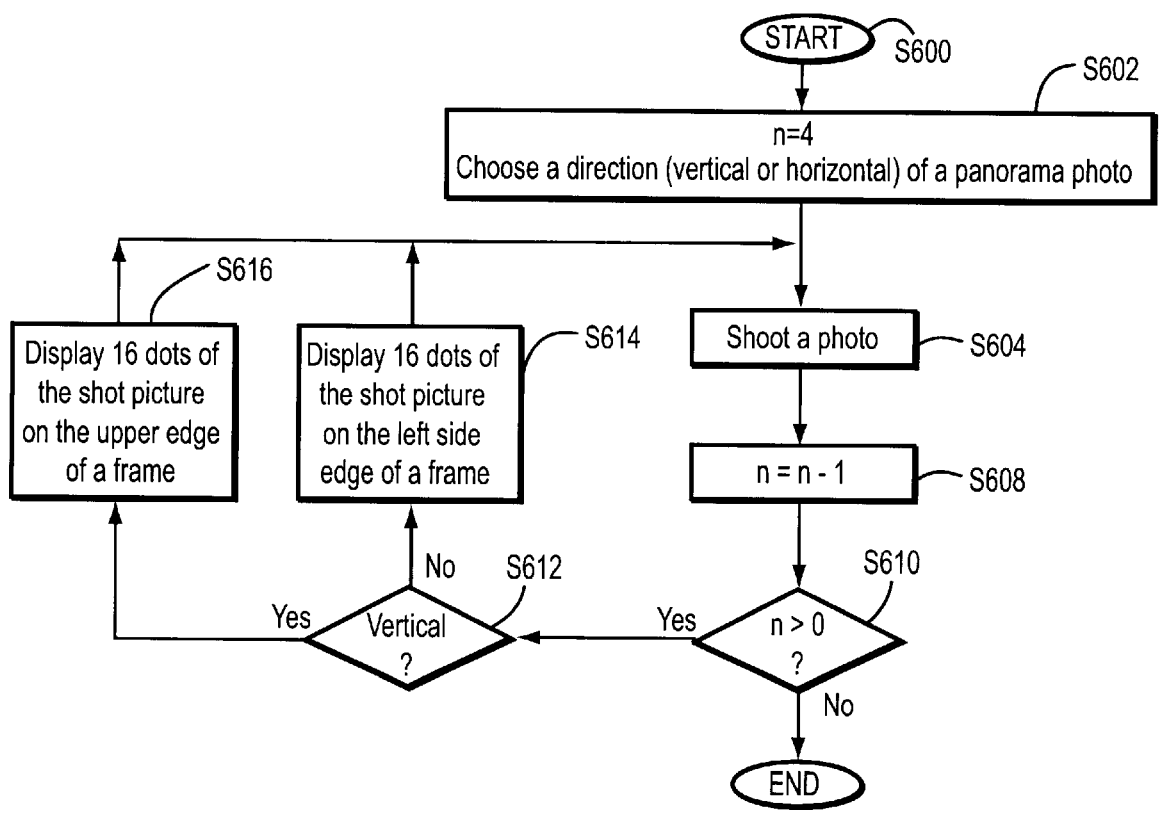
FIGS. 19A–19C are flow charts describing the panorama feature of the present invention.
Figure 19B:
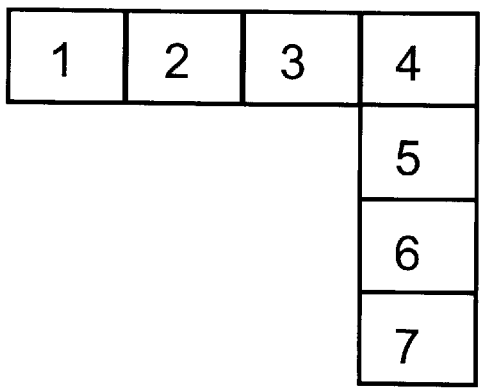
Figure 19C:
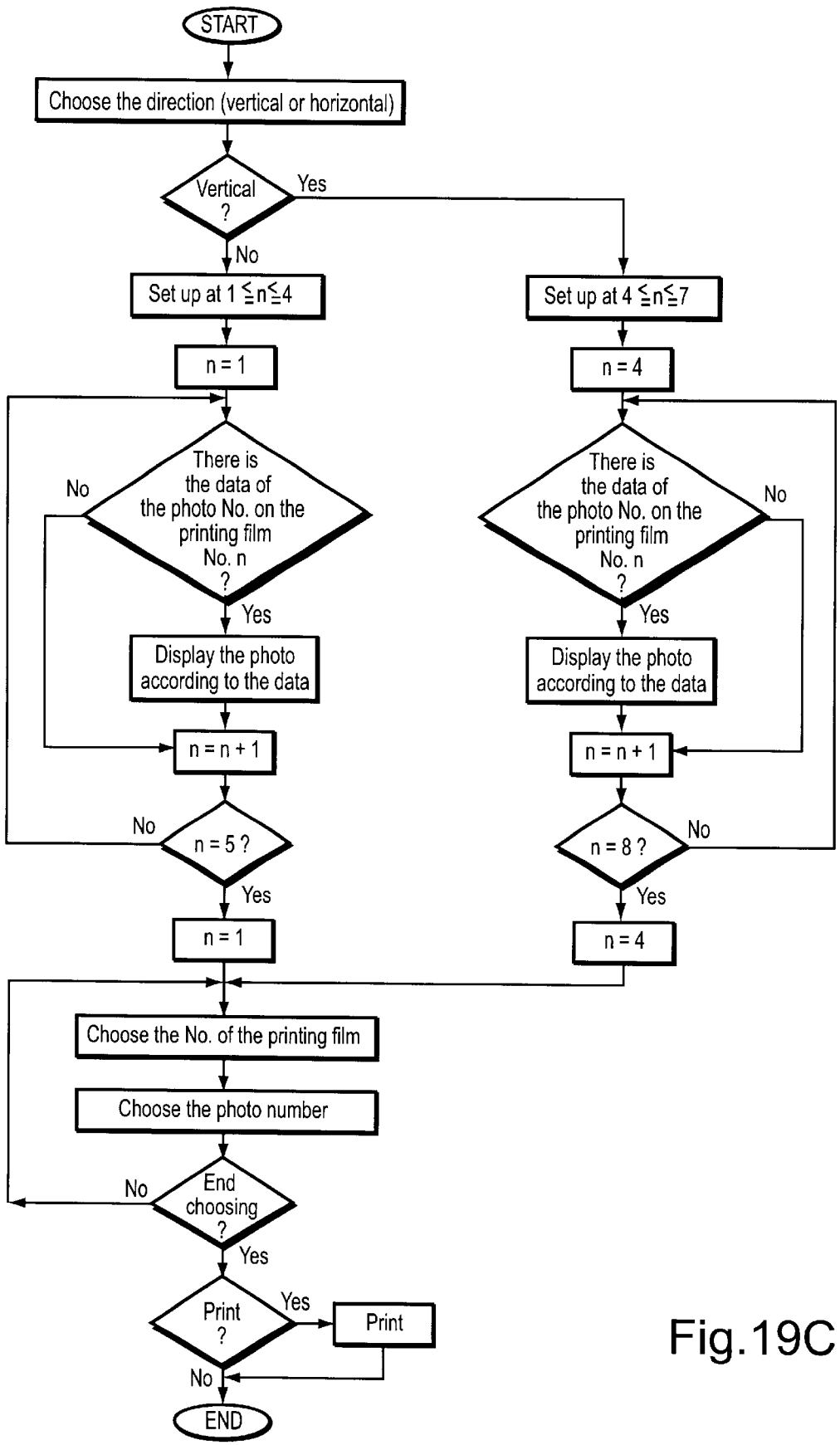

The panorama function of a preferred embodiment of the present invention is described herein with references to FIGS. 19A–19C. FIG. 19A shows the manner in which a panoramic image may be shot. Upon entering the panorama routine S600, a counter n is set to four. The counter n represents the number of frames that will make up the panoramic image. It will be understood that four image memory spaces are required for a panorama, and, as such, the routine first ensures that four memory spaces are available for use prior to allowing execution of the panorama function. The user must also choose a direction, i.e., horizontal or vertical, of the panoramic photo to be shot S602. The user then points the camera lens in the desired direction to begin capturing images and shoots the first image that will make up the panorama S604. The frame counter n is then decremented S608 and checked to see if four images have been shot or not S610. If n remains greater than zero in S610, it is then determined if the user has chosen a vertical or horizontal panorama S612. If a horizontal panorama is chosen, a strip of the previous image of the panorama having a width of, for example, sixteen dots is displayed on the left side edge of the frame S614, to provide the user with a means for aligning the subsequent shot. This routine is repeated until the four panoramic images have been shot and saved. Similarly, if a vertical panorama has been chosen, a strip sixteen dots wide of the previous picture is shown on an upper edge of the frame to provide alignment for the user S616. The frame ordering used for printing a panorama according to a preferred embodiment of the invention are shown in FIG. 19B. It is noted that there is no provision in the preferred embodiment of ensuring proper alignment of panoramas, and that this alignment is purely the responsibility of the user.

The method for printing out a panorama is shown with respect to FIG. 19C. It is noted that the panorama number associated with a given panorama is set forth in FIG. 19B. If a horizontal panorama is chosen, the four frames defining the horizontal panorama are printed out in order starting at n=1 to n=4. If, on the other hand, a vertical panorama is chosen, printing begins at n=4 through n=7.

In this manner, panoramic images may be shot and printed out for use. Panoramic images, as set forth above, allow the user to display images that are larger than a single frame.

Referring now to FIG. 21, a schematic representation of the image memory according to a preferred embodiment of the present invention. It will be understood that this particular image memory is merely a preferred illustrative example, and that any suitable memory configuration readily apparent to those skilled in the art may be used. The image memory is preferably in the form of a RAM that is backed up by a battery (not shown). A RAM is preferred from a cost standpoint, but it will be understood that any suitable type of memory may be used. The captured image portion of the memory 500 includes space for up to 30 captured images made up, for example, of 3584 bytes. Each image has a hot spot data portion 502 comprising, for example 30 bytes, that is configured as shown in FIG. 20. Additional data for items such as a comment field, user name and the like as described above 504, is also included. In a preferred embodiment, for example, each captured image is allocated 4096 bytes which includes the image data, hot spot data 502 and additional data 504 portions. The animation area of the memory 506 is constructed as a series of pointers to frames from the captured image area 500, and the predetermined image area 508. As set forth above, the predetermined image area 508 includes space for up to 30 predefined images. The predefined images do not include data for hot spots, comment fields, linking data, and the like, and are not available to be manipulated and re-saved into the predefined image area

508. Game faces are stored in area 510 of the memory and do not have data of the type associated with other captured images associated therewith. There is some linking information included with these images to ensure proper importation into the various games.

While this invention has been described in conjunction with specific embodiments thereof, it is evident that many alternatives, modifications and variations will be apparent to those skilled in the art. Accordingly, the preferred embodiments of the invention, as set forth therein, are intended to be illustrative, not limiting. Various changes may be made without departing from the true spirit and full scope of the invention, as defined in the following claims.

What is claimed is:

1. A method of operating a portable game machine having a removably attached external storage cartridge including an image capturing apparatus, said method comprising the steps of:

capturing an image using the image capturing apparatus of said external cartridge;

storing said captured image in a memory of said external cartridge;

associating effect linking information with said captured image, said effect linking information including an address in a memory of the external cartridge.

2. The method according to claim 1, wherein said effect linking information includes at least one of an address of a predetermined sound effect, an address of a predetermined visual effect, and an address of another captured image.

3. The method according to claim 1, wherein the step of associating includes editing existing effect linking information previously associated with the captured image.

4. The method according to claim 1, wherein said effect linking information includes information defining a location within said captured image corresponding to an actuation area for said effect linking information.

5. The method according to claim 4, further comprising the steps of:

storing the captured image together with the associated effect linking information in a memory;

retrieving the captured image together with the associated effect linking information from said memory;

defining, using a user interface, an actuation area of said captured image; and executing, upon location of said actuation area, an effect defined by said associated effect linking information.

6. The method according to claim 5, wherein said effect includes at least one of a sound effect, a visual effect and a jump to another captured image location within the memory.

7. The method according to claim 4, wherein up to five actuation areas of a captured image may have effect linking information associated therewith.

8. The method according to claim 5, wherein said effect linking information includes coordinates corresponding to an actuation area of said captured image defined by the user, enabling information of the actuation area, and at least one of an address of a predetermined sound effect that is executed upon location of an actuation area, an address of a predetermined visual effect that is executed upon location of an actuation area, and an address of another image to be displayed upon location of an actuation area.

9. The method according to claim 5, wherein the actuation area is defined by an eight pixel by eight pixel portion of the captured image defined by a user who associated the effect linking information with the captured image.

\* \* \* \* \*